United States Patent
Asgedom et al.

(10) Patent No.: US 9,791,580 B2
(45) Date of Patent: Oct. 17, 2017

(54) METHODS AND SYSTEMS TO SEPARATE WAVEFIELDS USING PRESSURE WAVEFIELD DATA

(71) Applicant: PGS Geophysical AS, Oslo (NO)

(72) Inventors: Endrias Getashew Asgedom, Oslo (NO); Okwudili Orji, Drammen (NO); Walter Söllner, Rio de Janeiro (BR)

(73) Assignee: PGS Geophysical AS, Oslo (NO)

( * ) Notice: Subject to any disclaimer, the term of this patent is extended or adjusted under 35 U.S.C. 154(b) by 127 days.

(21) Appl. No.: 14/522,377

(22) Filed: Oct. 23, 2014

(65) Prior Publication Data
US 2015/0301210 A1    Oct. 22, 2015

Related U.S. Application Data

(60) Provisional application No. 61/981,166, filed on Apr. 17, 2014.

(51) Int. Cl.
G01V 1/38    (2006.01)
G01V 1/30    (2006.01)

(52) U.S. Cl.
CPC ............... *G01V 1/303* (2013.01); *G01V 1/38* (2013.01)

(58) Field of Classification Search
CPC .................................. G01V 1/38; G01V 1/303
See application file for complete search history.

(56) References Cited

U.S. PATENT DOCUMENTS

| | | | |
|---|---|---|---|
| 6,151,275 | A | 11/2000 | Starr |
| 6,263,285 | B1 | 7/2001 | Starr |
| 6,654,694 | B2 | 11/2003 | Fokkema et al. |
| 6,704,244 | B1 | 3/2004 | Vaage |
| 6,894,948 | B2 | 5/2005 | Brittan et al. |
| 6,903,998 | B2 | 6/2005 | Vaage |
| 7,123,543 | B2 | 10/2006 | Vaage et al. |
| 7,616,523 | B1 | 11/2009 | Tabti et al. |
| 7,646,672 | B2 | 1/2010 | Kluver |
| 8,174,926 | B2 | 5/2012 | Kluver |

(Continued)

FOREIGN PATENT DOCUMENTS

EP    2685288    1/2014

OTHER PUBLICATIONS

Asgedom, Endrias G., "Pressure Normal Derivative Extraction for Arbitrarly Shaped Surfaces," 2014 SEG, SEG Denver 2014 Annual Meeting, pp. 4243-4247.
Search Report, Application No. GB1506367.0, Dated Oct. 2015.

*Primary Examiner* — Hovhannes Baghdasaryan

(57) ABSTRACT

This disclosure is directed to wavefield separation methods and systems. In one aspect, methods and systems compute an approximate vertical particle velocity wavefield based on a measured pressure wavefield and knowledge of free-surface when the pressure wavefield was measured. The measured pressure wavefield is used to compute an approximate frozen free-surface profile. The approximate frozen free-surface profile and the measured pressure wavefield are used to compute an approximate vertical particle velocity wavefield. The approximate vertical particle velocity wavefield and measured pressure wavefield may be used to compute separate up-going and down-going pressure, or vertical particle velocity, wavefields.

33 Claims, 30 Drawing Sheets

(56) References Cited

U.S. PATENT DOCUMENTS

| | | | |
|---|---|---|---|
| 2008/0089174 A1* | 4/2008 | Sollner | G01V 1/3808 367/21 |
| 2010/0091610 A1* | 4/2010 | Sollner | G01V 1/38 367/24 |
| 2013/0322205 A1 | 12/2013 | Widmaier et al. | |
| 2014/0119157 A1 | 5/2014 | Whitmore, Jr. et al. | |

* cited by examiner

METHODS AND SYSTEMS TO SEPARATE WAVEFIELDS USING PRESSURE WAVEFIELD DATA

CROSS-REFERENCE TO RELATED APPLICATION

This application claims the benefit of Provisional Application No. 61/981,166 on Apr. 17, 2014.

BACKGROUND

In recent years, the petroleum industry has invested heavily in the development of improved marine survey techniques and seismic data processing methods in order to increase the resolution and accuracy of seismic images of subterranean formations. Marine surveys illuminate a subterranean formation located beneath a body of water with acoustic signals produced by one or more submerged seismic sources. The acoustic signals travel down through the water and into the subterranean formation. At interfaces between different types of rock or sediment of the subterranean formation a portion of the acoustic signal energy may be refracted, a portion may be transmitted, and a portion may be reflected back toward the formation surface and into the body of water. A typical marine survey is carried out with a survey vessel that passes over the illuminated subterranean formation while towing elongated cable-like structures called streamers. The streamers may be equipped with a number of collated, dual pressure and particle motion sensors that detect pressure and vertical particle motion wavefields, respectively, associated with the acoustic signals reflected back into the water from the subterranean formation. The pressure sensors generate seismic data that represents the pressure wavefield and the particle motion sensors generate seismic data that represents the vertical particle motion wavefield. The survey vessel receives and records the seismic data generated by the sensors.

A wavefield that travels upward from the subterranean formation and is detected by the pressure or particle motion sensors is called an up-going wavefield, which alone may be used to compute a seismic image of the subterranean formation. However, the surface of the water acts as a nearly perfect acoustic reflector. As a result, the sensors also detect a down-going wavefield created by reflection of the up-going wavefield from the water surface. The down-going wavefield is essentially the up-going wavefield with a time delay that corresponds to the amount of time it takes for acoustic signals to travel up past the streamers to the water surface and back down to the streamers. The down-going wavefield combines with the up-going wavefield, resulting in recorded seismic data contaminated with unwanted down-going wavefield energy that creates "ghost" effects in seismic images of the subterranean formation computed from the seismic data. Typical seismic data processing techniques use both the pressure wavefield and vertical particle motion wavefield to separate the pressure and vertical particle motion wavefields into up-going and down-going wavefields. The up-going wavefield may be used to compute an image of a subterranean formation without the ghost effects caused by the down-going wavefield.

DETAILED DESCRIPTION

This disclosure is directed to methods and systems that perform wavefield separation. The methods and systems compute an approximate vertical particle velocity wavefield based on a measured pressure wavefield and knowledge of a free-surface when the pressure wavefield was measured. The measured pressure wavefield is used to compute an approximate frozen free-surface profile of the free-surface. The approximate frozen free-surface profile and the measured pressure wavefield are used to compute an approximate vertical particle velocity wavefield. The approximate vertical particle velocity wavefield and measured pressure wavefield may be used to compute separate up-going and down-going pressure wavefields or vertical particle velocity wavefields. The up-going pressure wavefield or vertical particle velocity wavefield may, in turn, be used to compute seismic images with significantly higher resolution and deeper signal penetration than seismic images computed with seismic data contaminated with the down-going wavefield. Removal of the effects of the down-going wavefield may reduce unwanted noise during marine surveying or reservoir production monitoring.

Figure 1A:
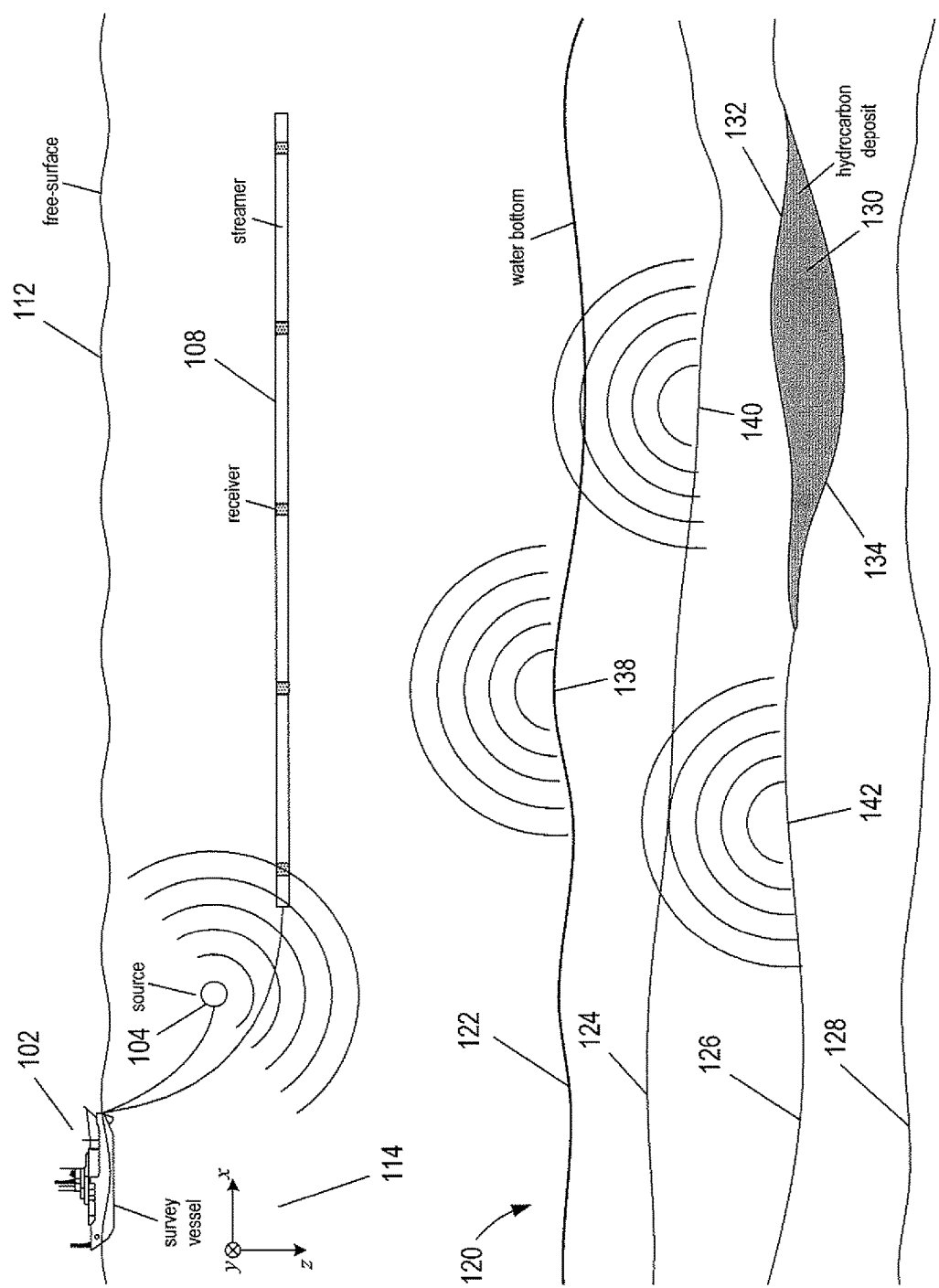
FIGS. 1A-1B show side-elevation and top views, respectively, of an example seismic data acquisition system.
Figure 1B:
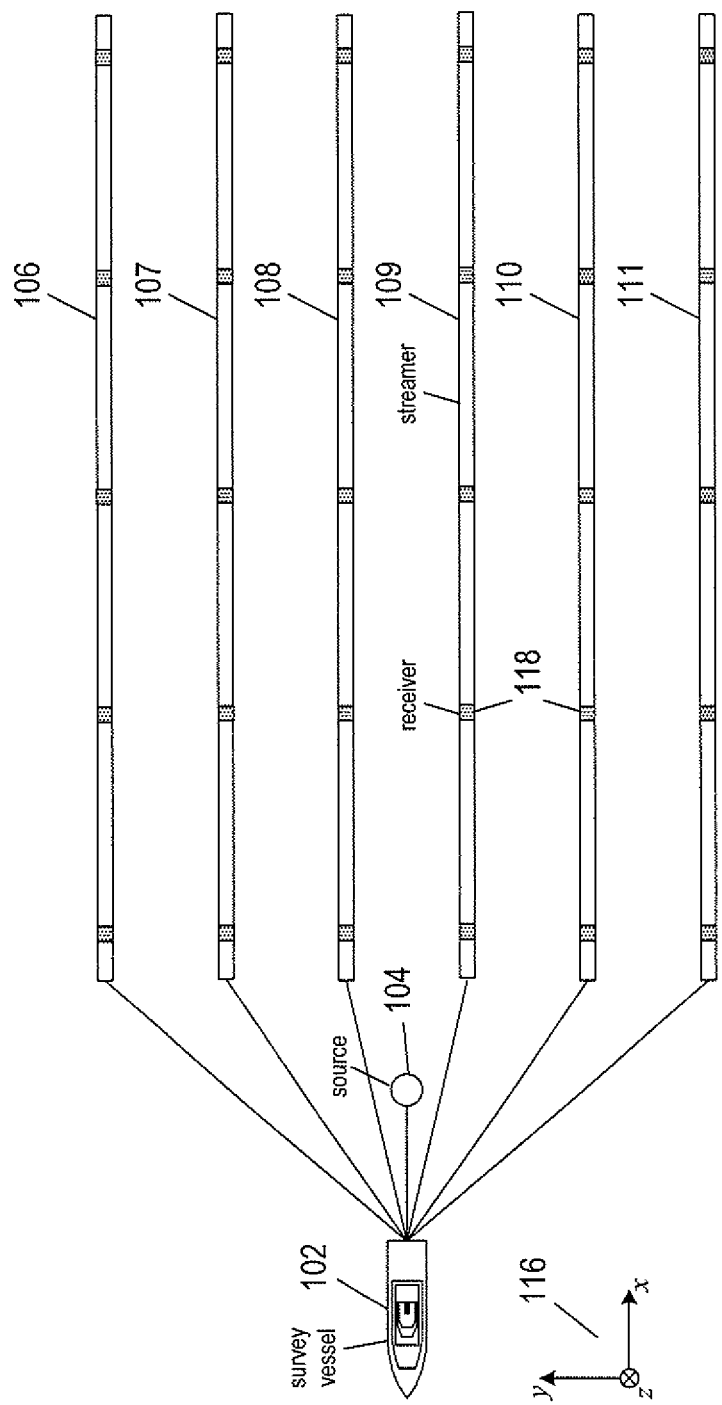

FIGS. 1A-1B show side-elevation and top views, respectively, of an example seismic data acquisition system composed of a survey vessel 102 towing a source 104 and six separate streamers 106-111 beneath a free-surface 112 of a body of water. The body of water may be, for example, an ocean, a sea, a lake, or a river, or any portion thereof. In this example, each streamer is attached at one end to the survey vessel 102 via a streamer-data-transmission cable. The illustrated streamers 106-111 form a planar horizontal data acquisition surface with respect to the free-surface 112. However, in practice, the data acquisition surface may be smoothly varying, for example, due to active sea currents and weather conditions. In other words, although the streamers 106-111 are illustrated in FIGS. 1A and 1B and subsequent figures as straight and substantially parallel to the free-surface 112, in practice, the towed streamers may undulate as a result of dynamic conditions of the body of water in which the streamers are submerged. A data acquisition surface is not limited to having a planar horizontal orientation with respect to the free-surface 112. The streamers may be towed at depths that angle the data acquisition surface with respect to the free-surface 112 or one or more of the streamers may be towed at different depths. A data acquisition surface is not limited to six streamers as shown in FIG. 1B. In practice, the number of streamers used to form a data acquisition surface can range from as few as one streamer to as many as 20 or more streamers. It should also be noted that the number of sources is not limited to a single source. In practice, the number of sources selected to generate acoustic energy may range from as few as one source to three or more sources and the sources may be towed in groups by one or more survey vessels.

FIG. 1A includes an xz-plane 114 and FIG. 1B includes an by-plane 116 of the same Cartesian coordinate system having three orthogonal, spatial coordinate axes labeled x, y and z. The coordinate system is used to specify orientations and coordinate locations within the body of water. The x-direction specifies the position of a point in a direction parallel to the length of the streamers (or a specified portion thereof when the length of the streamers are curved) and is referred to as the "in-line" direction. The y-direction specifies the position of a point in a direction perpendicular to the x-axis and substantially parallel to the free-surface 112 and is referred to as the "cross-line" direction. The z-direction specifies the position of a point perpendicular to the by-plane (i.e., perpendicular to the free-surface 112) with the positive z-direction pointing downward away from the free-surface 112. The streamers 106-111 are generally long cables containing power and data-transmission lines that connect receivers represented by shaded rectangles 118 spaced-apart along the length of each streamer to seismic data acquisition system and data-storage devices located on board the survey vessel 102.

Streamer depth below the free-surface 112 may be estimated at various locations along the streamers using depth measuring devices attached to the streamers. For example, the depth measuring devices can measure hydrostatic pressure or utilize acoustic distance measurements. The depth measuring devices may be integrated with depth controllers, such as para vanes or water kites that control and maintain the depth and position of the streamers as the streamers are towed through the body of water. The depth measuring devices are typically placed at intervals (e.g., about 300 meter intervals in some implementations) along each streamer. Note that in other implementations buoys may be attached to the streamers and used to help maintain the orientation and depth of the streamers below the free-surface 112.

FIG. 1A shows a cross-sectional view of the survey vessel 102 towing the source 104 above a subterranean formation 120. Curve 122 represents a top surface of the subterranean formation 120 located at the bottom of the body of water. The subterranean formation 120 is composed of a number of subterranean layers of sediment and rock. Curves 124, 126, and 128 represent interfaces between subterranean layers of different compositions. A shaded region 130, bounded at the top by a curve 132 and at the bottom by a curve 134, represents a subterranean hydrocarbon deposit, the depth and positionally coordinates of which may be determined, at least in part, by analysis of seismic data collected during a marine survey. As the survey vessel 102 moves over the subterranean formation 120, the source 104 is activated to produce an acoustic signal (often referred to as a "shot") at spatial and/or temporal intervals. In other implementations, the source 104 may be towed by one survey vessel and the streamers may be towed by a different survey vessel. The source 104 may be an air gun, marine vibrator, or composed of an array of air guns and/or marine vibrators. FIG. 1A illustrates an acoustic signal expanding outward from the source 104 as a pressure wavefield 136 represented by semicircles of increasing radius centered at the source 104. The outwardly expanding wavefronts from the sources may be three-dimensional (e.g., spherical) but are shown in vertical plane cross section in FIG. 1A. The outward and downward expanding portion of the pressure wavefield 136 is called the "primary wavefield," which eventually reaches the formation surface 122, at which point the primary wavefield is partially reflected from the formation surface 122 and partially refracted downward into the subterranean formation 120, becoming elastic waves within the subterranean formation 120. In other words, in the body of water, the acoustic signal is composed of compression al pressure waves, or P-waves, while in the subterranean formation 120, the waves include both P-waves and transverse waves, or S-waves. Within the subterranean formation 120, at interfaces between different types of materials or at discontinuities in density or in one or more of various other physical characteristics or parameters, downward propagating waves may be partially reflected and partially refracted. As a result, each point of the formation surface 122 and each point of the interfaces 124, 126, and 128 may be considered a reflector that becomes a potential secondary point source from which acoustic and elastic wave energy, respectively, may emanate upward toward the receivers 118 in response to the acoustic signal generated by the source 104. As shown in FIG. 1A, secondary waves of significant amplitude may be generally emitted from points on or close to the formation surface 122, such as point 138, and from points on or very close to interfaces in the subterranean formation 120, such as points 140 and 142. The upward expanding secondary waves emitted from the subterranean formation 120 are collectively called the "secondary wavefield."

The secondary waves that compose the secondary wavefield may be generally emitted at different times within a range of times following the initial acoustic signal. A point on the formation surface 122, such as the point 138, may receive a pressure disturbance from the primary wavefield more quickly than a point within the subterranean formation 120, such as points 140 and 142. Similarly, a point on the formation surface 122 directly beneath the source 104 may receive the pressure disturbance sooner than a more distant-lying point on the formation surface 122. Thus, the times at which secondary and higher-order waves are emitted from various points within the subterranean formation 120 may be related to the distance, in three-dimensional space, of the points from the activated source.

Acoustic and elastic waves, however, may travel at different velocities within different materials as well as within the same material under different pressures. Therefore, the travel times of the primary wavefield and secondary wavefield emitted in response to the primary wavefield may be functions of distance from the source 104 as well as the materials and physical characteristics of the materials through which the wavefields travel. In addition, the secondary expanding wavefronts may be altered as the wavefronts cross interfaces and as the velocity of sound varies in the media are traversed by the waves. The superposition of waves emitted from within the subterranean formation 120 in response to the primary wavefield may be a generally complicated wavefield that includes information about the shapes, sizes, and material characteristics of the subterranean formation 120, including information about the shapes, sizes, and locations of the various reflecting features within the subterranean formation 120 of interest to exploration geophysicists.

Figure 2:
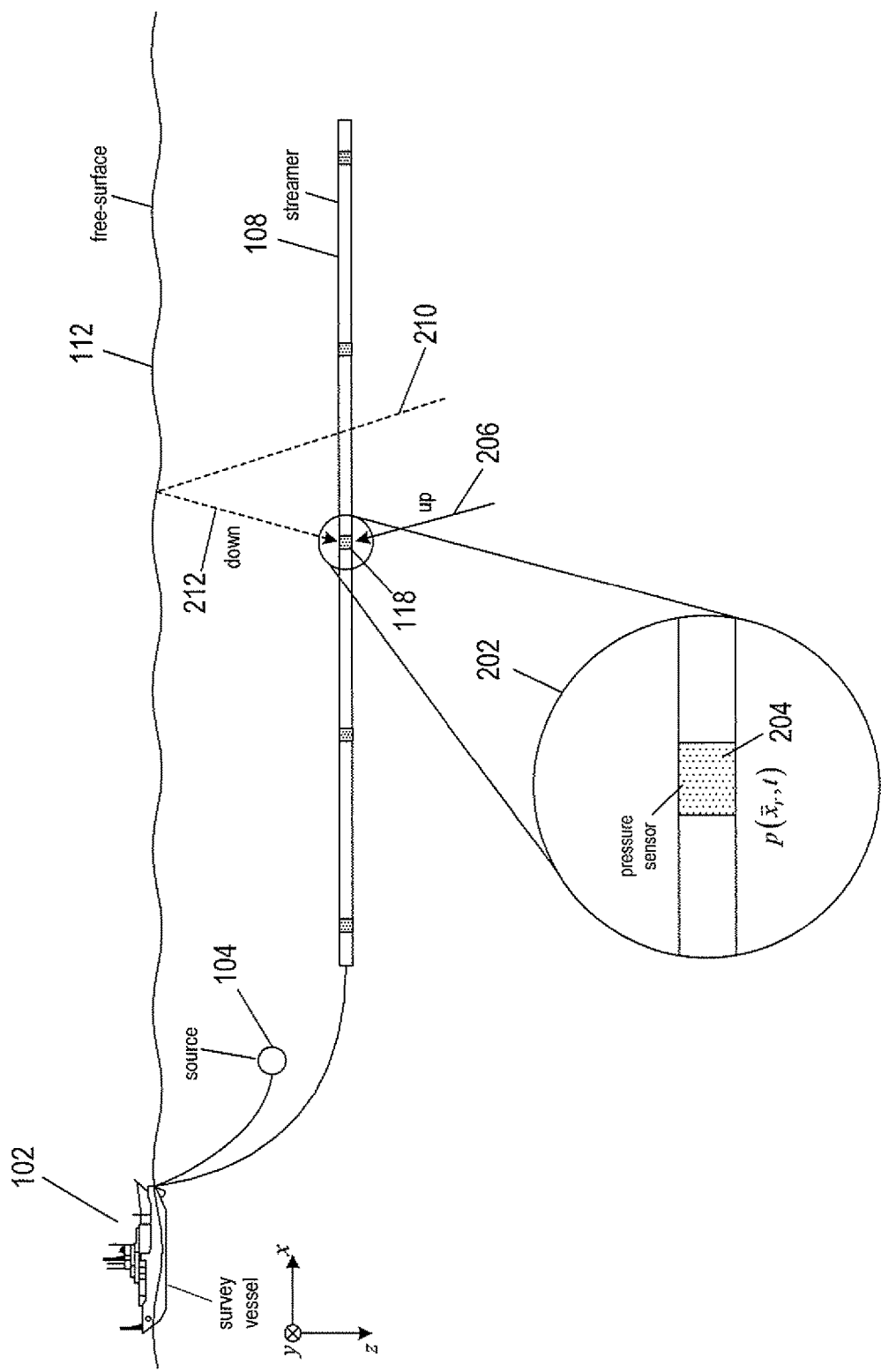
FIG. 2 shows a side-elevation view of a seismic data acquisition system with a magnified view of a receiver.

Each receiver 118 may comprise a pressure sensor that detects variations in water pressure over time. FIG. 2 shows a side-elevation view of the seismic data acquisition system with a magnified view 202 of the receiver 118. In this example, the magnified view 202 reveals that the receiver 118 comprises a pressure sensor 204. The pressure sensors 204 may be, for example, hydrophones. Each pressure sensor 204 may measure non-directional, hydrostatic pressure changes over time and may produces pressure wavefield data denoted by $p(\vec{x}_r,t)$, where $\vec{x}_r=(x_r,y_r,z_r)$ represent the receiver Cartesian coordinates, and t represents time. The depth $z_r$ of each receiver 118 may be estimated from the depth measurements obtained from the depth measuring devices located along the streamers.

Seismic data includes data generated by the receivers 118 when detecting hydrostatic pressure changes over time. The streamers 106-111, receivers 118, and the survey vessel 102 may include sensing electronics and data-processing facilities that allow seismic data generated by each receiver 118 to be correlated with the time and location of each source activation, absolute positions on the free-surface 112, and absolute three-dimensional positions with respect to an arbitrary three-dimensional coordinate system. The seismic data may be stored at the receivers 118 and/or may be sent along the streamers and data transmission cables to the survey vessel 102, where the data may be stored electronically or magnetically on data-storage devices located onboard the survey vessel 102. The seismic data generated by the receivers 118 may represent pressure changes in the secondary wavefield emitted from the subterranean formation 120.

At least a portion of the secondary wavefield emitted from the subterranean formation 120 may propagate upward toward the free-surface 112, forming an up-going wavefield. In FIG. 2, directional arrow 206 represents the direction of an up-going wavefield at the location of receiver 118, and dashed arrows 210 and 212 represents a down-going wavefield produced by the up-going wavefield reflection from the free-surface 112 before reaching the receiver 118. In other words, the pressure wavefield data $p(\vec{x}_r,t)$ measured by the receivers 118 is composed of an up-going pressure wavefield component and a down-going pressure wavefield component. The down-going wavefield contaminates seismic data and creates notches in the seismic data spectral domain.

Each receiver 118 may generate an electrical or optical signal that encodes the seismic data, which may be recorded on a physical data-storage device that may be located at the receiver, at components along the streamer, or onboard the survey vessel. The seismic data is generally a time series of consecutively measured values, called amplitudes, separated in time by a sample rate. The time-series seismic data measured by a receiver is called a "trace," which may consist of thousands of time samples of amplitudes collected at a sample rate of about 1 to 5 ms. A trace is generally a record of a subterranean formation response to acoustic energy that passes from an activated source, into the subterranean formation where the reflected acoustic energy is detected by a receiver as described above. A trace generated by a pressure sensor is pressure wavefield data that may be represented as a set of time-dependent pressure amplitudes denoted by:

$$p(\vec{x}_r,t)=\{a_r(t_j)\}_{j=1}^{J} \qquad (1)$$

where r is a positive integer trace, receiver, or channel index;
j is a time sample index;
J is the number of time samples; and
$a_r(t_j)$ is the pressure amplitude of the r-th trace at time sample $t_j$.

Each trace also includes a trace header, not represented in Equation (1), that identifies the specific receiver that generated the trace, receiver GPS coordinates, and may include time sample rate and the number of samples.

As explained above, the secondary wavefield typically arrives first at the receivers located closest to the sources. The distance from the sources to a receiver is called the "source-receiver offset," or simply "offset," which creates a delay in the arrival time of a secondary wavefield from an interface within the subterranean formation. A larger offset generally results in a longer arrival time delay. Various sets of traces are collected to form seismic data structures called "gathers" that may be further processed using various seismic data processing techniques in order to extract information about the structure of the subterranean formation.

Figure 3:
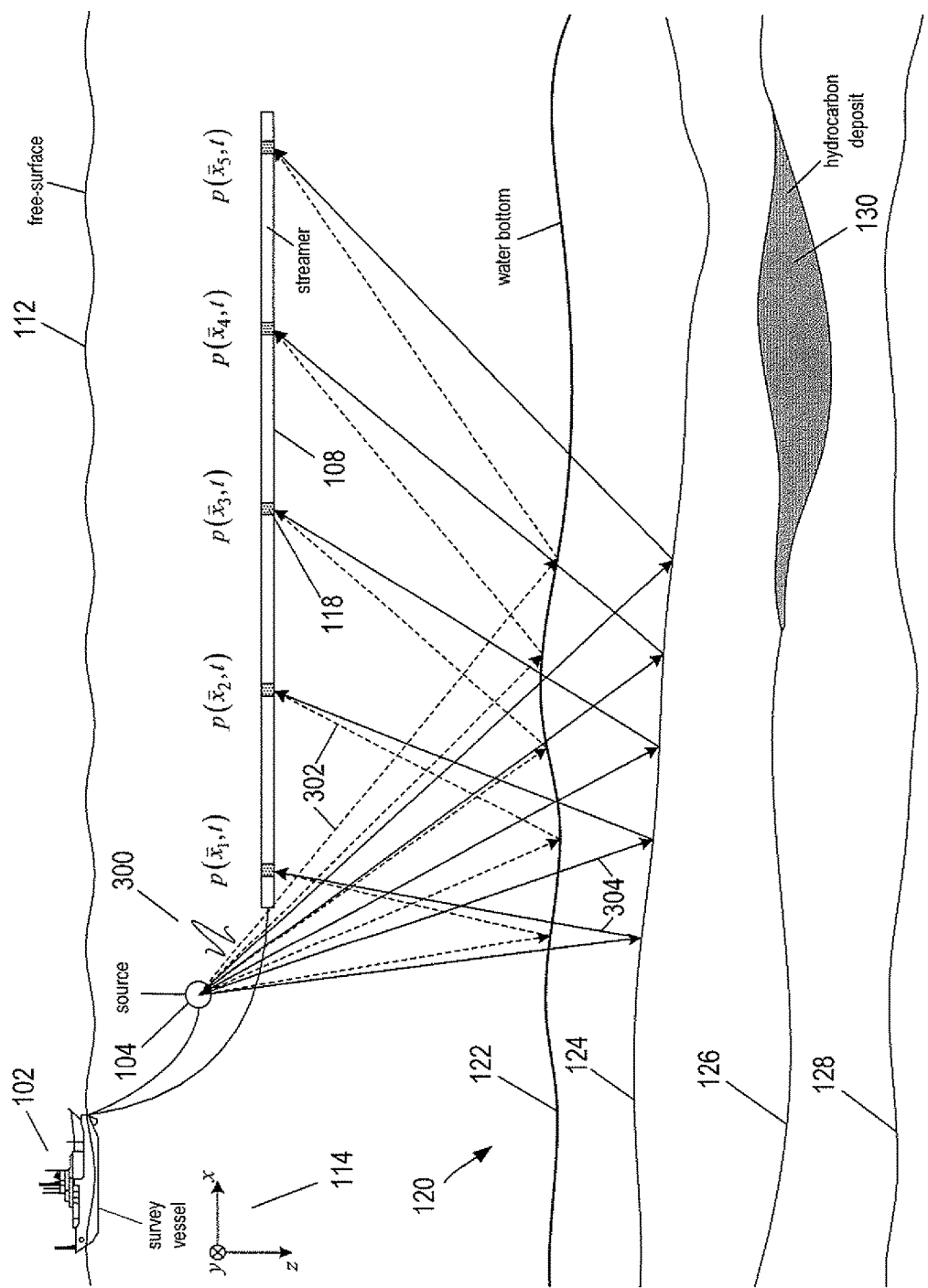
FIG. 3 shows example ray paths that represent paths of an acoustic signal that travels from a source into a subterranean formation.

FIG. 3 shows example ray paths that represent an acoustic signal 300 that travels from the source 104 into the subterranean formation 120. Dashed-line rays, such as rays 302, represent acoustic energy reflected from the formation surface 122 to the receivers 118 located along the streamer 108, and solid-line rays, such as rays 304, represent acoustic energy reflected from an interface 124 to the receivers 118 located along the streamer 108. Note that for simplicity of illustration only a handful of ray paths are represented, and ray paths that extend to deeper interfaces are not shown. Each receiver 118 measures pressure changes resulting from the acoustic energy reflected from the subterranean formation 120. The pressure wavefield data generated at each receiver 118, $p(\vec{x}_r,t)$, where the receiver subscript r equals 1, 2, 3, 4, and 5, are time recorded as separate traces in one or more data-storage devices as described above with reference to Equation (1). In the example of FIG. 3, the collection of traces generated by the five receivers 118 located along the streamer 108 for a single activation of the source 104 may be collected to form a seismic data structure called a "common-shot gather." The traces generated by the receivers 118 located along each of the six streamers 108, shown in FIG. 1B, for the same activation of the source 104 may be collected to form six separate common-shot gathers.

Figure 4:
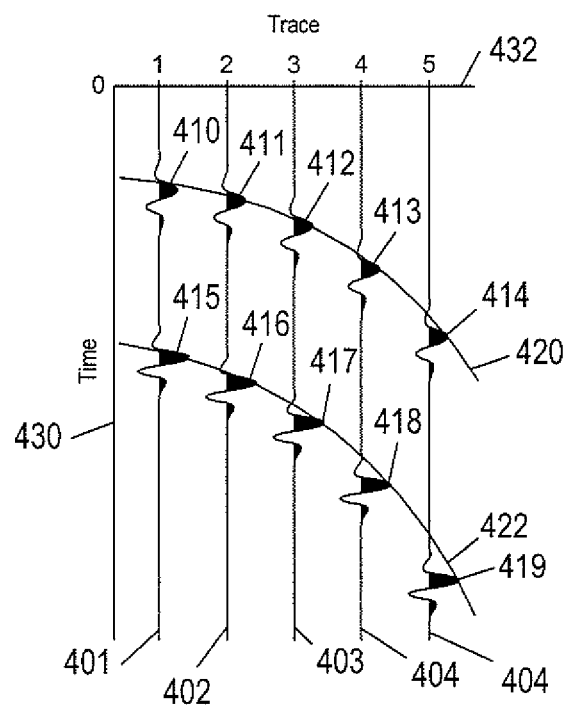
FIG. 4 shows a plot of a synthetic common-shot gather composed of example traces.

FIG. 4 shows a plot of a synthetic common-shot gather composed of example traces 401-405 of the pressure wavefield data recorded by the five receives located along the streamer 108 shown in FIG. 3. Vertical axis 430 represents time and horizontal axis 432 represents trace numbers. The traces are arranged so that trace 401 represents the seismic data generated by the receiver 118 located closest to the source 104 and trace 405 represents the seismic data generated by the receiver 118 located farthest (along the length of the streamer) from the source 104. In this example, the traces 401-405 represent variation in the amplitude of the seismic data recorded by the five receivers 118. The example traces include wavelets or pulses 406-410 and 411-415 represented by peaks colored black that represent the up-going wavefield measured by the pressure sensors 204. The time intervals along the traces 401-405 from the trace number axis 432 (i.e., time zero) to the wavelets 406-410 represents two-way travel time of the acoustic energy output from the source 104 to the formation surface 122 and to the receivers 118 located along the streamer 108, and the wavelets 411-415 represent longer two-way travel time of the acoustic energy output from the source 104 to the interface 124 and to the same receivers 118 located along the streamer 108. The amplitudes of the peaks or troughs of the wavelets 406-410 and 411-415 indicate the magnitude of the reflected acoustic energy recorded by the receivers 118.

The arrival times of acoustic energy at the receivers increases with increasing source-receiver offset. The wavelets generated by a formation surface and an interface reflection of acoustic energy are collectively called a "reflected wave" or simply "reflection" that, in this example, tracks a parabolic-shaped curve. For example, curve 416 represents the distribution of the wavelets 406-410 reflected from the formation surface 122, which are called a "formation surface reflected wave", and curve 418 represents the distribution of the wavelets 411-415 from the interface 124, which are called an "interface reflected wave" or "interface reflection."

Figure 5:
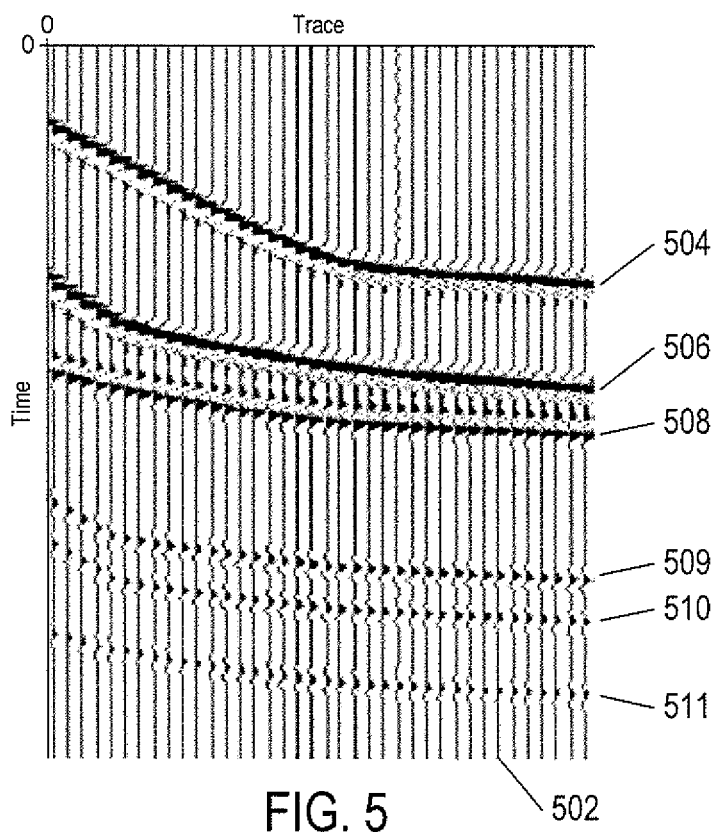
FIG. 5 shows an example expanded view of a synthetic gather composed of 38 traces.

FIG. 5 shows an example expanded view of a synthetic gather composed of 38 traces. Each trace, such as trace 502, varies in amplitude over time and represents acoustic energy reflected from the formation surface and five different interfaces within a subterranean formation as measured by a pressure sensor. In the expanded view, wavelets that correspond to reflection from the same formation surface or interface of the subterranean formation appear chained together or to overlap. For example, wavelets 504 with the shortest transit time represent a formation surface reflection, and wavelets 506 represent an interface reflected wave emanating from an interface just below the formation surface. Reflected waves 508-511 represent reflections from interfaces located deeper within the subterranean formation.

The synthetic gathers shown in FIGS. 4 and 5 represent ideal cases in which acoustic reflections from features of a subterranean formation are measured directly by the receivers. But, in practice, seismic data typically collected in actual marine surveys record other types of acoustic energy reflections that contaminate the seismic data. For example, seismic data obtained from a marine survey records the up-going wavefield scattered directly from a subterranean formation and the down-going wavefield reflected from the free-surface described above with reference to FIG. 2. The down-going wavefield is essentially a time-delayed up-going wavefield. The down-going wavefield interferes with the up-going wavefield by cancelling frequencies (i.e., creating notches) in the frequency spectrum of the seismic data and creates "ghost" effects in seismic images generated from the seismic data. The up-going wavefield may be separated from the down-going wavefield when the vertical particle velocity wavefield of the acoustic energy reflected from features of the subterranean formation is known. Methods and systems now described compute an approximate vertical particle velocity wavefield based on a measured pressure wavefield and the shape of the free-surface at the time the pressure wavefield is measured. The approximate vertical particle velocity wavefield and the measured pressure wavefield may then be used to compute separate up-going and down-going wavefields.

Figure 6A:
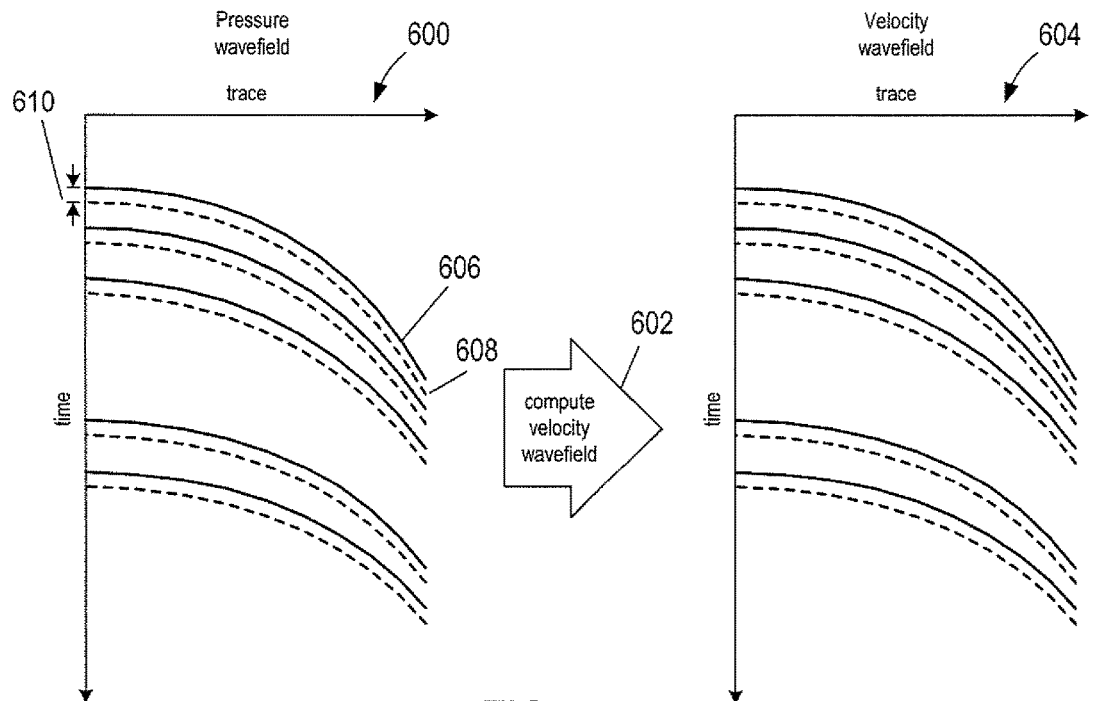
FIGS. 6A-6C show an overview of how a measured pressure wavefield may be separated into up-going and down-going pressure wavefields.
Figure 6B:
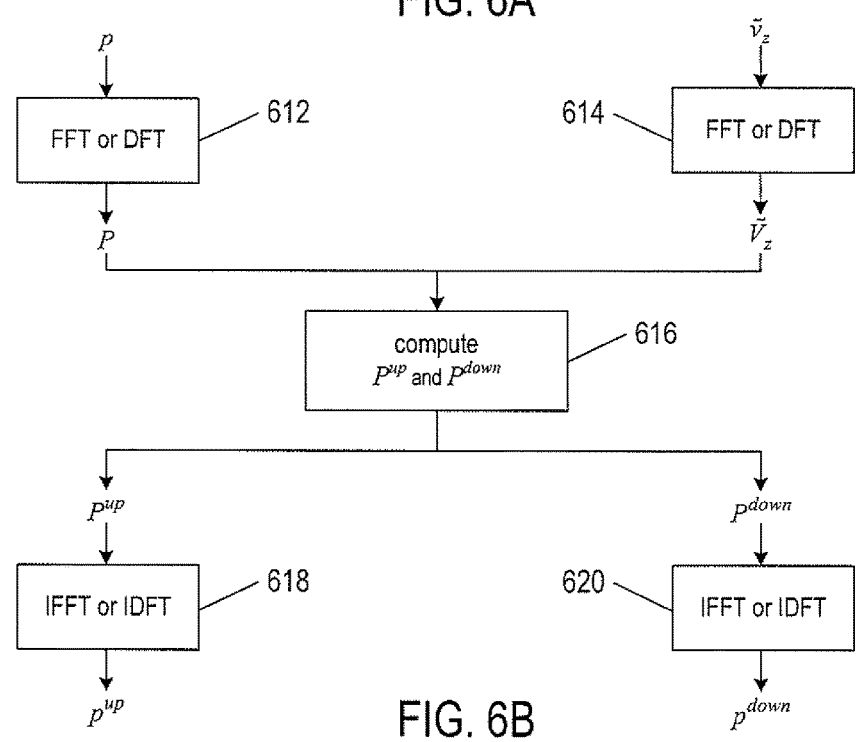
Figure 6C:
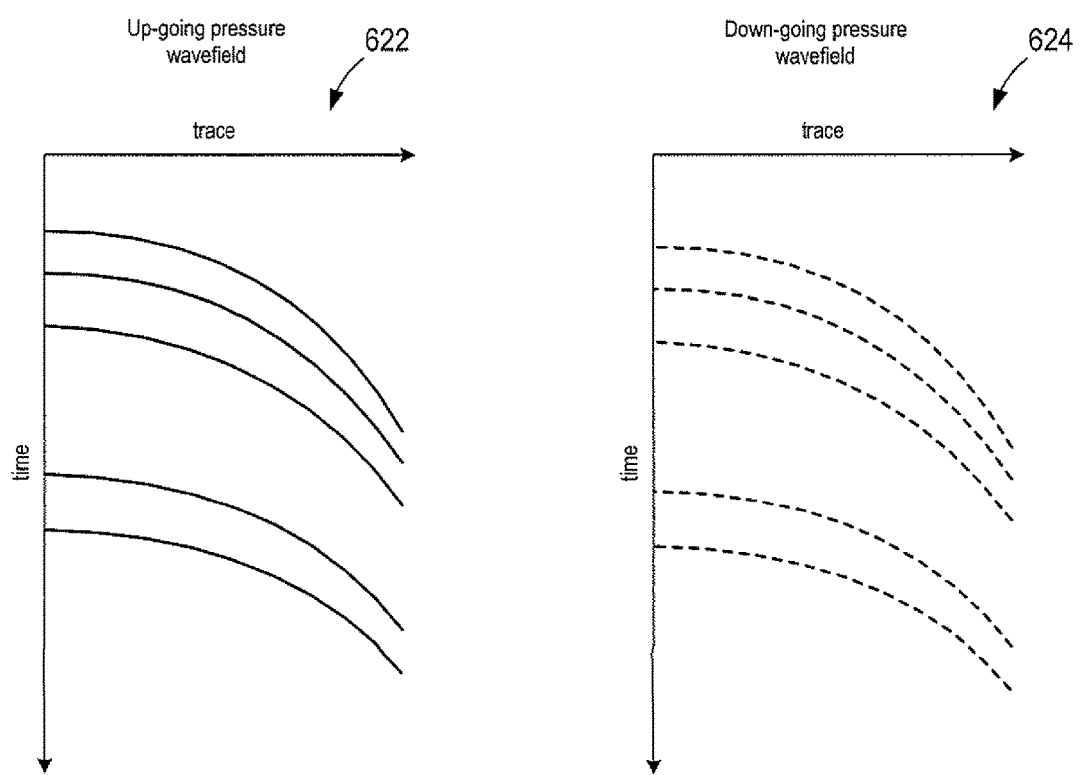

FIGS. 6A-6C provide an overview of how a measured pressure wavefield may be separated into up-going and down-going pressure wavefields without a measured vertical particle velocity wavefield. In FIG. 6A, synthetic common-shot gather 600 represents a portion of a pressure wavefield measured by a number of receivers, such as receivers located along a streamer, after activation of a source. For the sake of simplicity, the gather 600 shows only up-going and down-going pressure wavefield components of the pressure wavefield. The solid curves represent the up-going pressure wavefield and dashed curves represent the down-going pressure wavefield. For example, solid curve 606 represents pressure variations created by a formation surface reflection, and dashed curve 608 represents pressure variations created by the same formation surface reflection with a time delay 610 resulting from the time it takes for acoustic energy to travel up past the streamer to the free-surface and back down to the streamer, as described above with reference to FIG. 2. The methods and systems described herein compute 602 an approximate vertical particle velocity wavefield represented by a gather 604 based on the pressure wavefield data recorded in the gather 600 and knowledge of the free-surface shape above the streamers at the time the pressure wavefield is measured. In other words, for each trace in the gather 600 that corresponds to the pressure wavefield measured at a receiver, an approximate vertical particle velocity trace is computed for the same receiver:

$$p(\vec{x}_r,t) \rightarrow \tilde{v}_z(\vec{x}_r,t) \qquad (2)$$

where $\tilde{v}_z(\vec{x}_r,t)$ represents a vertical particle velocity trace at the receiver $(x_r,y_r,z_r)$.

The approximate vertical particle velocity $\tilde{v}_z(\vec{x}_r,t)$ is an approximation of the vertical particle velocity $v_z(\vec{x}_r,t)$ that may have been obtained from a particle motion sensor collated with the receiver used to measure the pressure wavefield data $p(\vec{x}_r,t)$. The approximate vertical particle velocity wavefield represented by the gather 604 is similarly composed of up-going and down-going vertical particle velocity wavefield components identified by solid and dashed curves, respectively.

Once the approximate vertical particle velocity wavefield is computed, the measured pressure wavefield and the approximate vertical particle velocity wavefield may be used to compute separate up-going and down-going pressure wavefield components of the measured pressure wavefield. In FIG. 6B, the pressure wavefield, denoted by p, is transformed 612 from the space-time ("s-t") domain using a fast Fourier transform ("FFT"), or a discrete Fourier transform ("DFT"), to obtain pressure wavefield P in the frequency-wavenumber ("f-k") domain. In the frequency-wavenumber domain, the pressure wafefield P may be decomposed into a sum of the up-going pressure wavefield and the down-going pressure wavefield as follows:

$$P = P^{up} = P^{down} \quad (3)$$

where
$P^{up}$ represents the up-going pressure wavefield in the f-k domain; and
$P^{down}$ represents the down-going pressure wavefield in the f-k domain.

The approximate vertical particle velocity wavefield, denoted by $\tilde{v}_z$, is also transformed 614 from the s-t domain using an FFT, or a DFT, to obtain an approximate vertical particle velocity wavefield $\tilde{V}_z$ in the f-k domain. The up-going and down-going pressure wavefields in the f-k domain are computed 616 according to $$P^{up} \approx \frac{1}{2}\left[P - \frac{\rho\omega}{k_z}\tilde{V}_z\right] \quad (4a)$$

$$P^{down} \approx \frac{1}{2}\left[P + \frac{\rho\omega}{k_z}\tilde{V}_z\right] \quad (4b)$$

where
ρ is the density of water;
ω is angular frequency; and
$k_z$ is the z-direction or vertical wavenumber.

In other words, once the approximate vertical particle velocity wavefield $\tilde{V}_z$ is computed, the pressure wavefield P may be separated, or decomposed, into up-going and down-going pressure wavefields according to Equations (4a) and (4b). The separate up-going and down-going pressure wavefields, $P^{up}$ and $P^{down}$, may be transformed 618 and 620 from the f-k domain back to the s-t domain using an inverse FFT ("IFFT"), or inverse ("IDFT"), to obtain separate up-going and down-going pressure wavefields, $p^{up}$ and $p^{down}$, in the s-t domain. Alternatively, the measured pressure wavefield and the approximate vertical particle velocity wavefield may be used to compute approximate up-going and down-going vertical particle velocity wavefield components of the vertical particle velocity wavefield.

In FIG. 6C, the up-going and down-going pressure wavefields combined in the pressure wavefield represented by the gather 600 of FIG. 6A are shown in separate up-going pressure wavefield gather 622 and down-going pressure wavefield gather 624. The pressure wavefield represented by the up-going pressure wavefield in the gather 622 may be subjected to further seismic data processing to remove noise and other effects and serve as input to imaging methods that generate seismic images of the subterranean formation. The resulting seismic images may have significantly higher resolution and deeper signal penetration into the subterranean formation than seismic images computed with the unseparated seismic data represented in the gather 600.

Methods and systems compute an approximate vertical particle velocity wavefield based on the measured pressure wavefield and on knowledge of the shape of the free-surface above the data acquisition surface when the pressure wavefield is measured. Methods and systems described herein compute the shape of the free-surface above the data acquisition surface based on the measured pressure wavefield. FIGS. 7-15 illustrate calculation of the shape of a free-surface above a streamer based on a pressure wavefield measured by receivers located in the streamer. The shape of the free-surface at the time the pressure wavefield is measured is assumed to be in a fixed or frozen-in-time state called a frozen free-surface.

Figure 7:
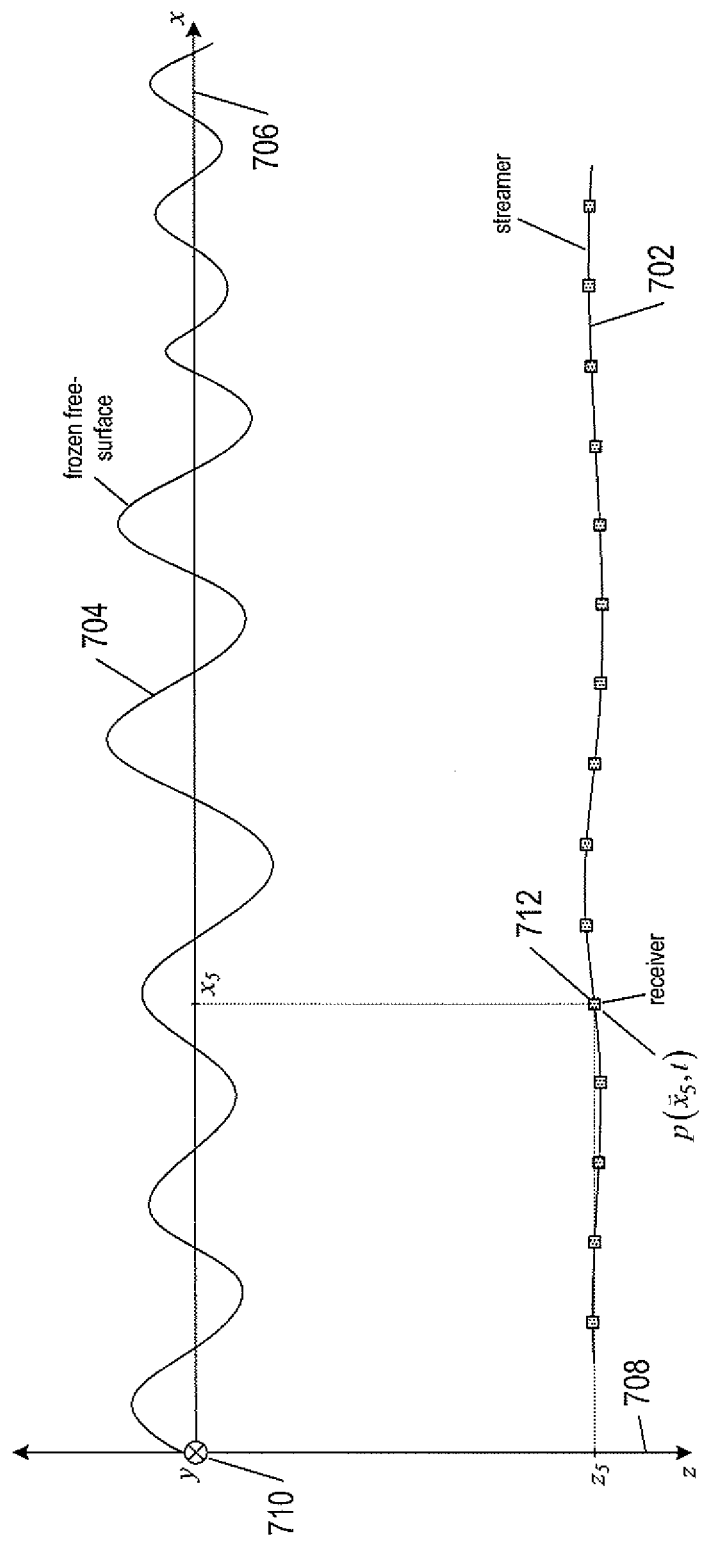
FIG. 7 shows a side-elevation view of a streamer located in a body of water below a frozen free-surface.

FIG. 7 shows a side-elevation view of a streamer 702 located in a body of water below a free-surface 704. In FIG. 7, horizontal axis 706 represents the in-line, or x-direction, vertical axis 708 represents depth, and circle 710 represents the cross-line or, y-direction, orthogonal to the xz-plane. The depth $z_r$ and the elevation of the free-surface are estimated with respect to the geoid, which corresponds to the x-axis 706. The geoid is the hypothetical surface of the earth that coincides with the mean sea level and is used to define zero elevation (i.e., z=0). The streamer 702 includes 14 spaced apart receivers, such as receiver 712, that each measure a different portion of a pressure wavefield. The streamer 702 may be part of larger data acquisition surface composed of any number of streamers towed by a survey vessel not shown. Each receiver may generate pressure wavefield data $p(\vec{x}_r,t)$ as described with reference to Equation (1), such as pressure wavefield data $p(\vec{x}_s,t)$ generated for the fifth receiver 712 of the streamer 702.

FIGS. 7-9 and 16 included the frozen free-surface 704 which represents a snapshot of the free-surface above the streamer 702 when the pressure wavefield data $p(\vec{x}_r,t)$ is recorded. The frozen free-surface 704 has a fixed cross-sectional shape above the streamer 702 when the pressure wavefield data $p(\vec{x}_r,t)$ is generated for each activation of a source, consequently referred to as a "frozen free-surface." In practice, the actual shape of the frozen free-surface 704 is not known but the frozen free-surface 704 is included in the follow illustrations in order to depict computation of an approximate frozen free-surface as now described with reference to FIGS. 8-16.

Figure 8:
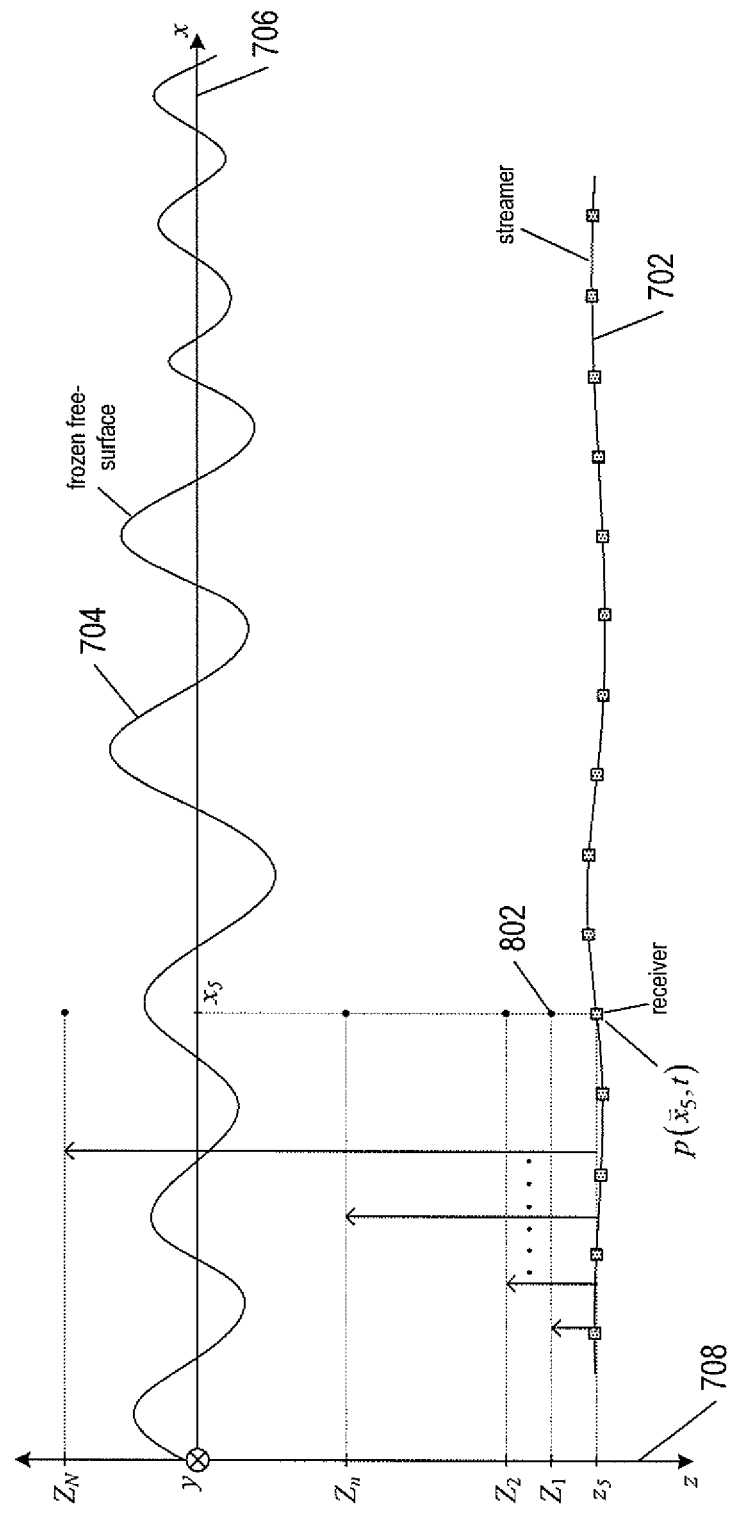
FIG. 8 shows a streamer, a frozen free-surface, and an example series of trial depths.

The fixed cross-sectional shape of the frozen free-surface 704 is computed by forward and backward extrapolation of the pressure wavefield at a series of trial depths above the streamer. FIG. 8 shows the streamer 702 and frozen free-surface 704' and an example series of trial depths $Z_1$ through $Z_N$, where N is a positive integer. Dots, such as dot 802, identify the series of regularly spaced trial depths above the receiver 712. In this example, the trial depths extend beyond the frozen free-surface 704 as represented by final trial depth 804 $Z_N$.

Extrapolation is carried out by first transforming the pressure wavefield data generated by each receiver from the s-t domain to the f-k domain as follows:

$$p(\vec{x}_r,t) \rightarrow P(k_x,k_y,\omega|z_r) \quad (5)$$

The transformation may be executed with an FFT or a DFT. Next, at each trial depth, the pressure wavefield data generated at each receiver is forward and backward extrapolated to the trial depth level to obtain forward and backward extrapolated wavefields that correspond to the trial depth.

For each receiver, the pressure wavefield data is forward extrapolated to a trial depth $Z_n$ according to $$P^F(k_x,k_y,\omega|Z_n)=P(k_x,k_y,\omega|z_r)e^{-ik_z(z_r-z_n)} \quad (6)$$

and backward extrapolated to the same trial depth $Z_n$ according to $$P^B(k_x,k_y,\omega|Z_n)=P(k_x,k_y,\omega|z_r)e^{ik_z(z_r-z_n)} \quad (7)$$

where
i is the imaginary unit $\sqrt{-1}$;
$k_x$ is the horizontal wavenumber in the x-direction;
$k_y$ is the horizontal wavenumber in the y-direction; and
$k_z=\sqrt{k^2-k_x^2-k_y^2}$.

For each trial depth $Z_n$, the forward and backward extrapolated pressure wavefield data associated with each receiver is then transformed from the f-k domain back to the s-t domain:

$$P^F(k_x,k_x,\omega|Z_n) \rightarrow p^F(x_r,y_r,t|Z_n) \quad (8a)$$

$$P^B(k_x,k_y,\omega|Z_n) \rightarrow p^B(x_r,y_r,t|Z_n) \quad (8b)$$

where
superscript "F" represents forward extrapolated; and
superscript "B" represents backward extrapolated.
The transformation may be executed with an IFFT or an IDFT.

Figure 9:
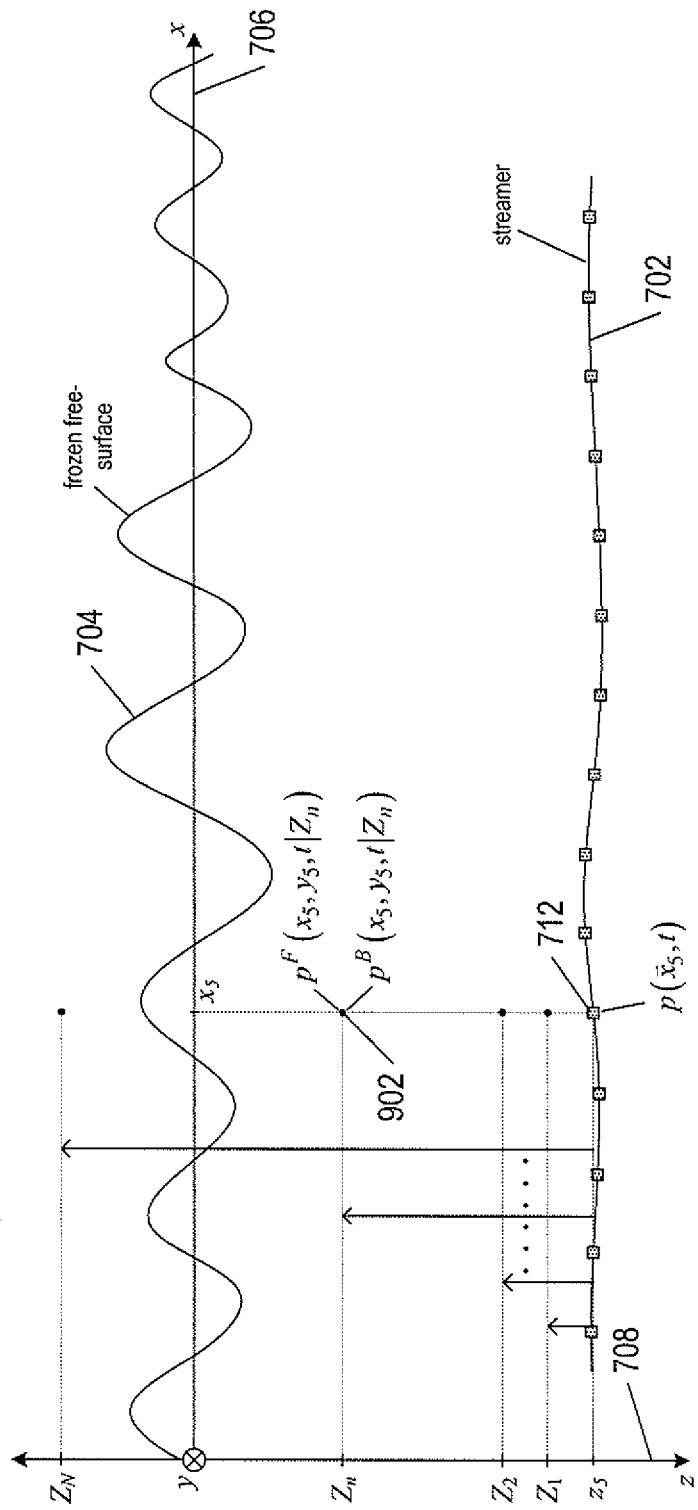
FIG. 9 shows an example of forward and backward extrapolated pressure wavefield at a trial depth.

FIG. 9 shows an example of forward and backward extrapolated pressure wavefield data at the trial depth $Z_n$ 902 for the fifth receiver 712. The forward and backward extrapolated pressure wavefield data at the trial depth $Z_n$ are represented by $p^F(x_5,y_5,t|Z_n)$ and $p^B(x_5,y_5,t|Z_7)$, respectively. For each trial depth $Z_n$ with n=1, . . . , N, forward and backward extrapolated pressure wavefield data $p^F(x_r,y_r,t|Z_n)$ and $p^B(x_r,y_r,t|Z_n)$ are computed for each receiver (i.e., r=1, . . . , 14) of the streamer 702.

For each trial depth $Z_n$, the forward extrapolated pressure wavefield data computed for each receiver are collected to form a forward extrapolated gather $$p^F(x,y,t|Z_n)=\{p^F(x_r,y_r,t|Z_n)\}_{r=1}^R \quad (9a)$$

where R is the number of receivers.
Backward extrapolated pressure wavefield data computed for each receiver are also collected to form a backward extrapolated gather $$p^B(x,y,t|Z_n)=\{p^B(x_r,y_r,t|Z_n)\}_{r=1}^R \quad (9b)$$

Figure 10:
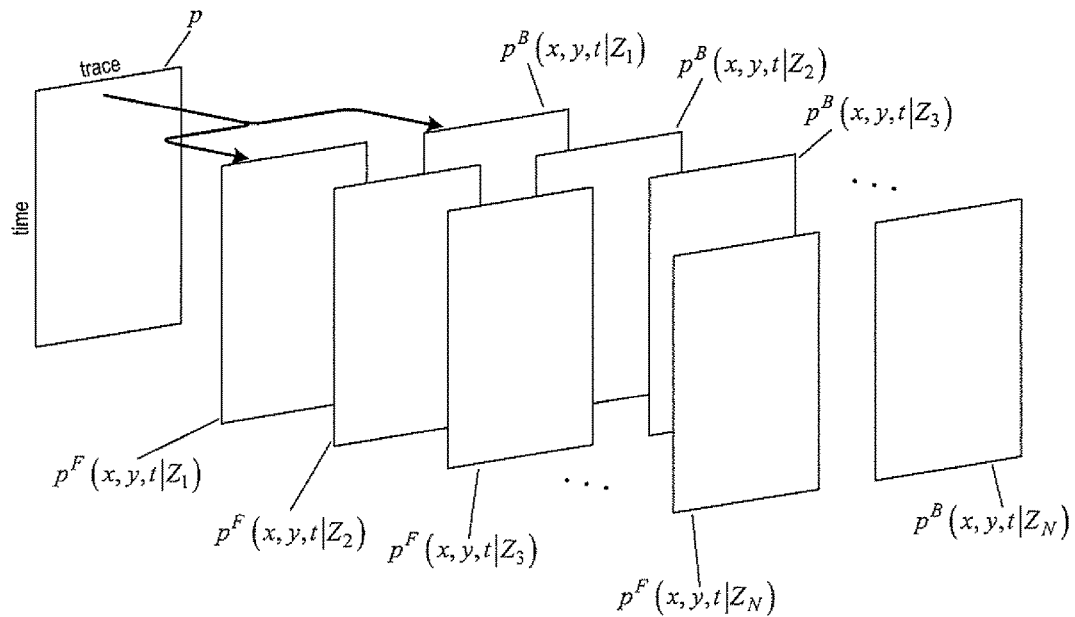
FIG. 10 shows a series of forward extrapolated gathers and corresponding backward extrapolated gathers for a series of trial depths.

FIG. 10 shows a series of forward extrapolated gathers and corresponding backward extrapolated gathers computed for each trial depth $Z_n$ with n=1, . . . , N. Rectangle 1002 represents a common-shot gather of pressure wavefield data p generated by a number of receivers located along a streamer. Pair of rectangles represent the forward and backward extrapolated gathers computed for each of the trial depths $Z_n$. For example, pair of rectangles 1004 and 1006 represent forward and backward extrapolated gathers for the first trial depth $Z_1$ and pair of rectangles 1008 and 1010 represent forward and backward extrapolated gathers for the final trial depth $Z_N$.

A difference gather may be computed for each pair of forward and backward extrapolated gathers. In other words, for each trial depth $Z_n$, a difference gather is computed as follows:

$$d(x,y,t|Z_n)=p^F(x,y,t|Z_n)-p^B(x,y,t|Z_z) \quad (10)$$

Amplitudes of the forward extrapolated gather $p^F(x,y,t|Z_n)$ are represented by $a_r^F(t_j|Z_n)$ and amplitudes of the backward extrapolated gather $p^B(x,y,t|Z_n)$ are represented by $a_r^B$ ($t_j|Z_n$), where r is a trace index, $t_j$ is the time sample index, and $Z_n$ identifies the trial depth. Amplitude differences, $A_r(t_j|Z_n)$, for each difference gather $d(x,y,t|Z_n)$ may be executed according to the following pseudo code:

```
1    for n = 1,...,N {           //trial depth
2        for r = 1,...,R {       //receivers/traces
3            for j = 1,...,J {   //time samples
4                A_r(t_j|Z_n) = a_r^F(t_j|Z_n) - a_r^B(t_j|Z_n);
5            }
6        }
7        store difference gather d(x,y,t|Z_n) =
             {{A_r(t_j|Z_n)}_{j=1}^J}_{r=1}^R;//gather
8    }
```

Figure 11:
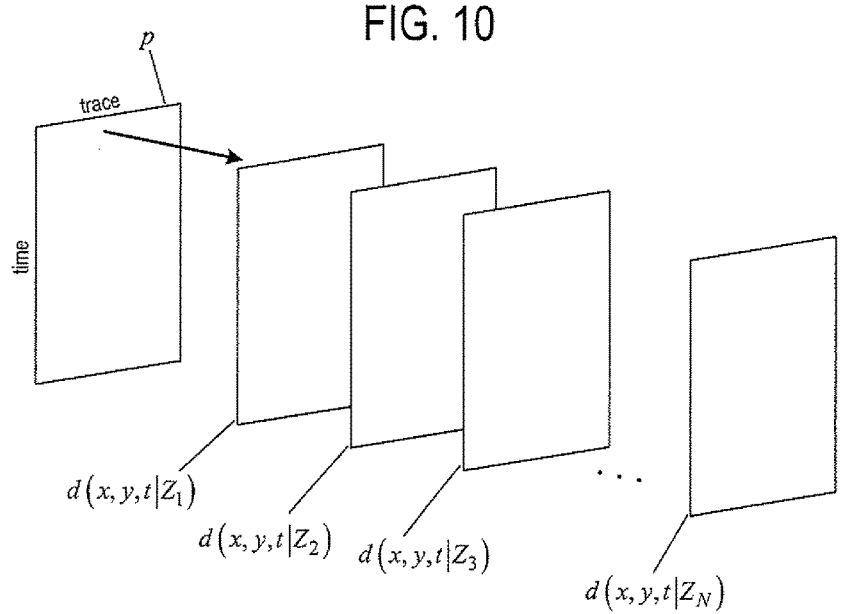
FIG. 11 shows difference gathers computed from pairs of forward and backward extrapolated gathers shown in FIG. 10.

FIG. 11 shows difference gathers computed from the pairs of forward and backward extrapolated gathers shown in FIG. 10. Rectangle 1102 represents a difference gather obtained by computing the difference between the pair of forward and backward extrapolated gathers 1004 and 1006 shown in FIG. 10. Rectangle 1104 represents a difference gather obtained by computing the difference between the pair of forward and backward extrapolated gathers 1008 and 1010 shown in FIG. 10.

Figure 12A:
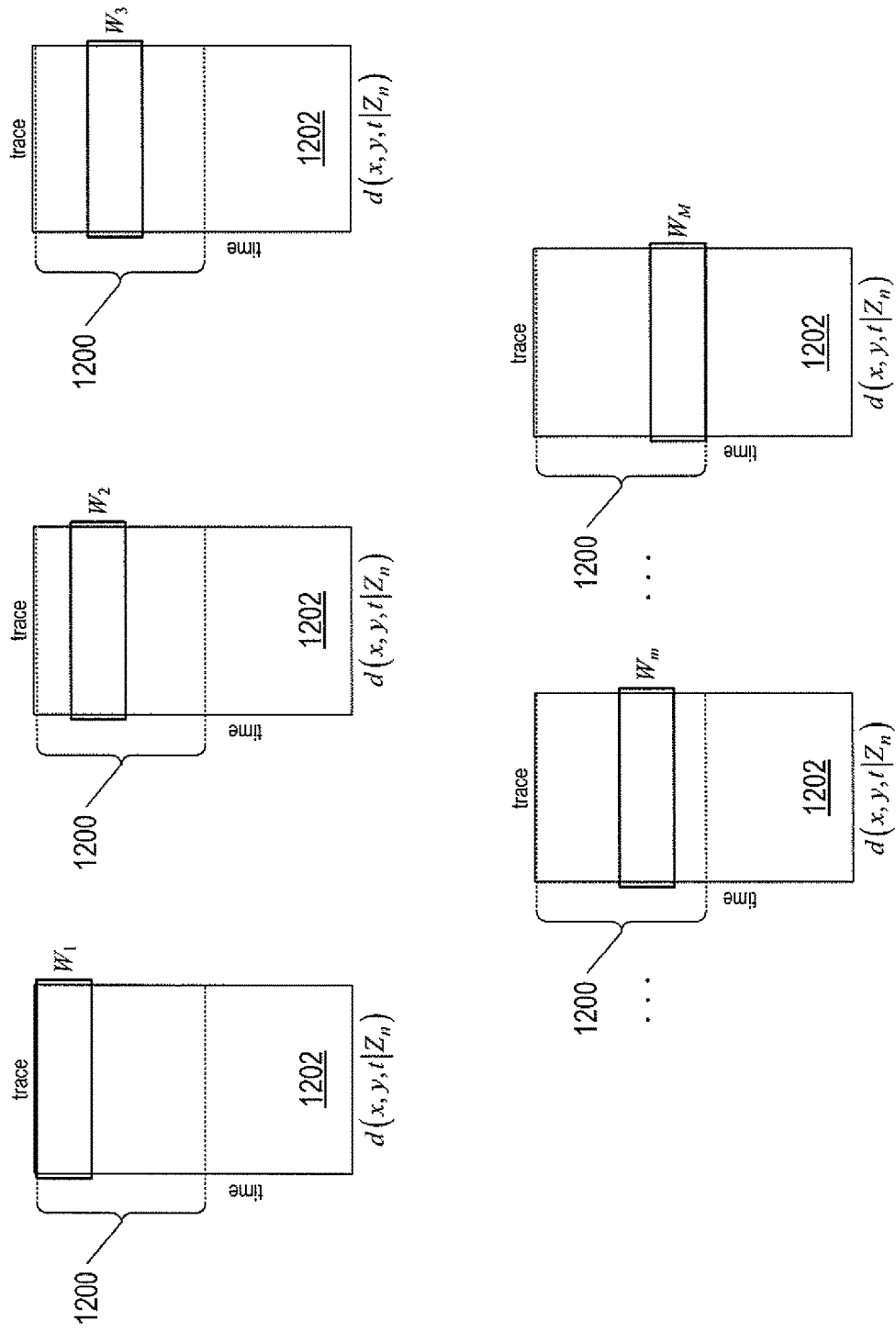
FIGS. 12A-12C show an example calculation of a maximum energy difference for a series of time windows.
Figure 12B:
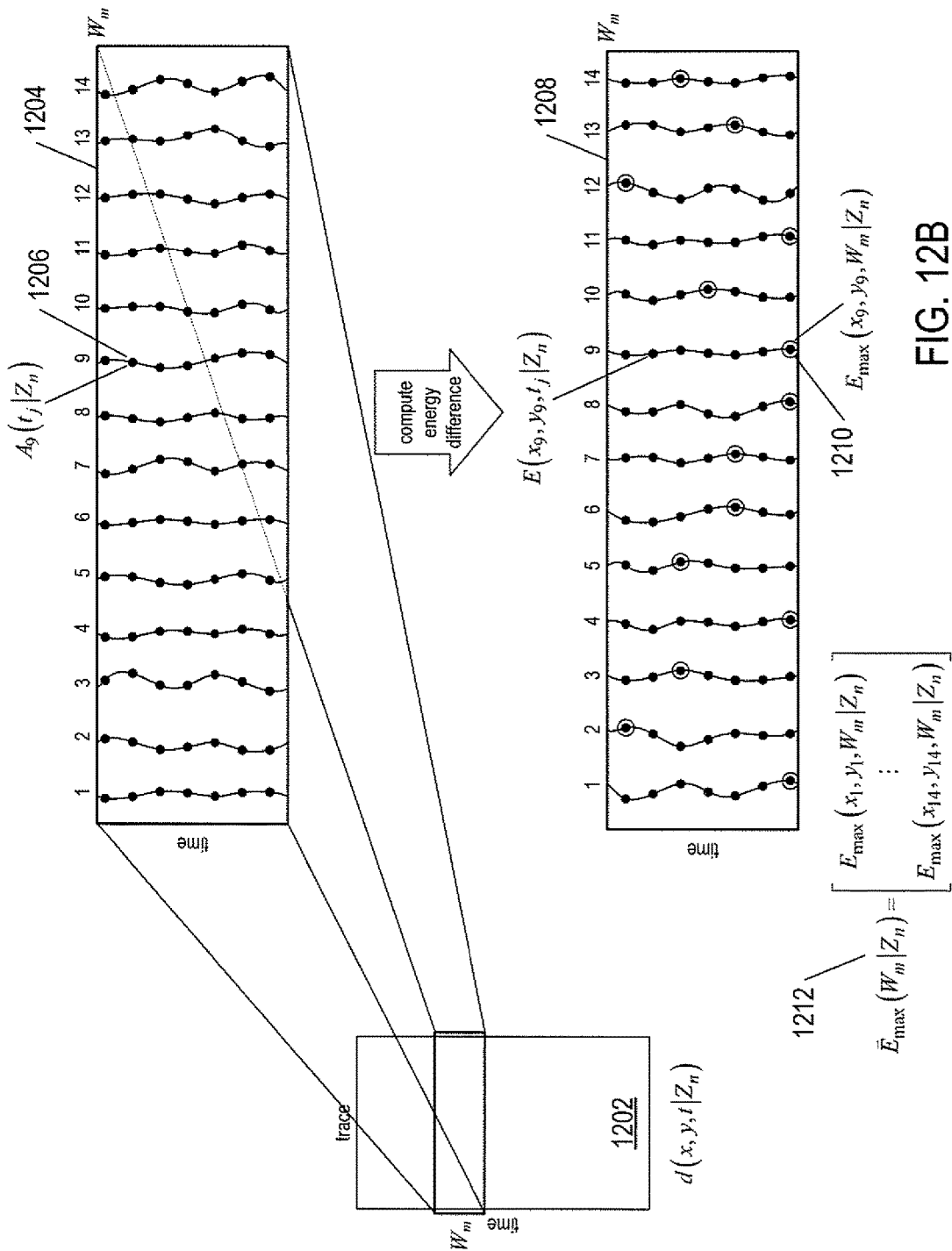
Figure 12C:
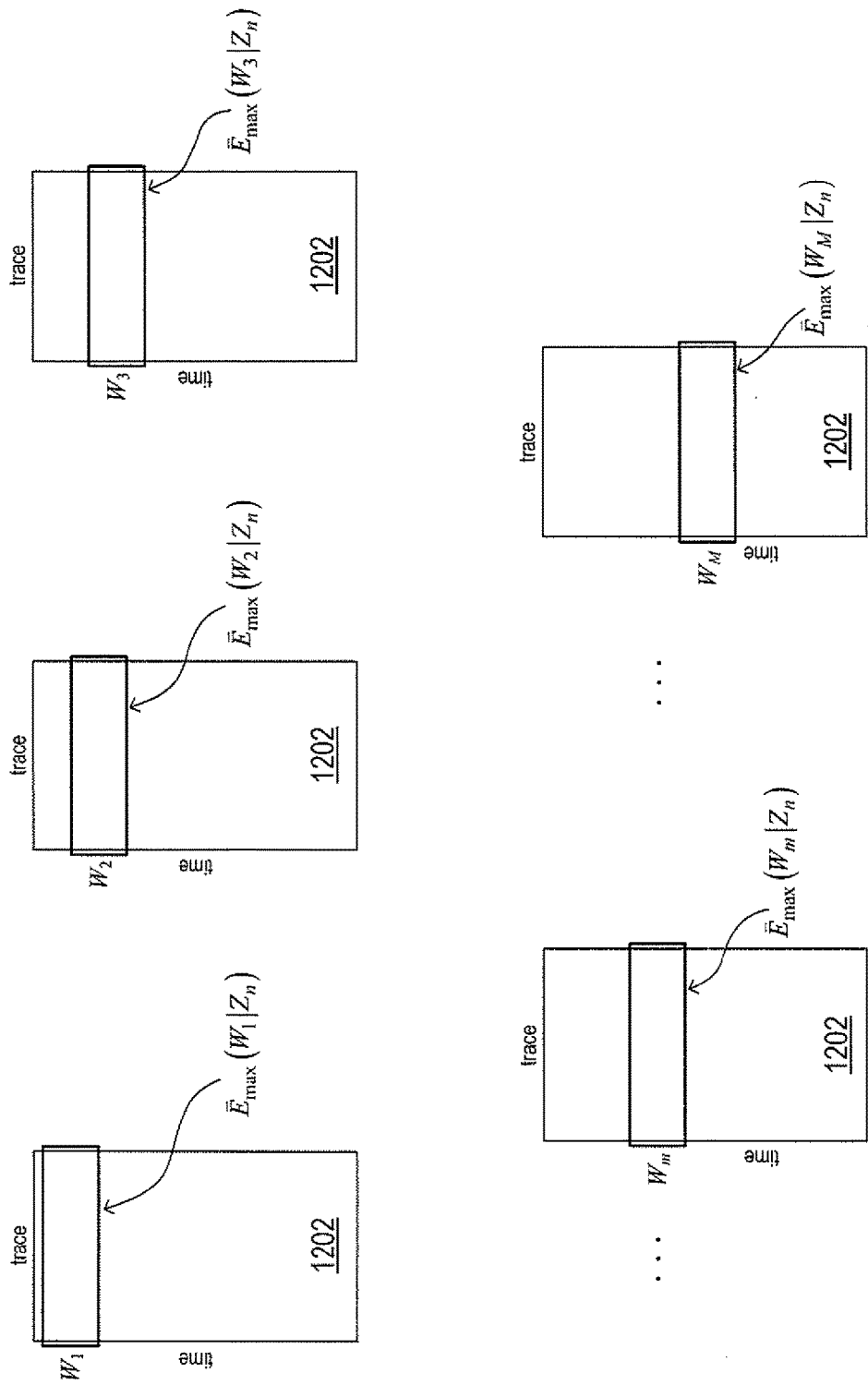

A series of time windows are applied to each difference gather and a maximum energy difference is calculated for each time window. FIGS. 12A-12C show an example calculation of a maximum energy difference for each time window. FIG. 12A shows an example of a series of time windows applied to a time region 1200 of a difference gather $d(x,y,t|Z_n)$ 1202. In this example, the time windows are represented by rectangles that span a time subinterval and the full set of traces of the difference gather 1202. The time windows are denoted by $W_m$, where m=1, . . . , M is the time window index and M is the total number of time windows in the time window series. Initially, time window $W_1$ is located over the earliest time interval of the difference gather 1202, time window $W_m$ is located over an intermediate time interval, and time window $W_M$ is located over a later time interval. In certain implementations the time windows may intersect while in other implementations the time windows may not intersect. In alternative implementations, the time windows and the region of the difference gather the series of time windows are applied to may be hyperbolic in order to approximate the curved shaped of reflections created by source receiver offset in common-shot gathers described above with reference to FIG. 4. In still other implementations, the time series windows may be applied to the full difference gather.

FIG. 12B shows a rectangle 1204 that represents an enlargement of the time window $W_m$ located over a time interval of the difference gather 1202 shown in FIG. 12. Solid circles located within the time window $W_m$ represent amplitude differences $A_r(t_j|Z_n)$ calculated according to Equation (10). For example, solid circle 1206 represents an amplitude difference $A_9(t_j|Z_n)$ calculated for a trace r=9. For each amplitude difference in the time window $W_m$, a corresponding energy difference is calculated according to $$E(x_r,y_r,t_j\epsilon W_m|Z_n)=[A_r(t_j|Z_n)]^2 \quad (11)$$

Rectangle 1208 represents the time window $W_m$ with energy differences calculated according to Equation (11) for each of the amplitude differences in the time window $W_m$. For example, $E(x_9,y_9,t_j|Z_n)$ represents the energy difference for the 9-th trace at the j-th time sample determined by computing the square of the amplitude difference $A_9(t_j|Z_n)$ represented by circle 1206 in rectangle 1204. A maximum energy difference is determined for each trace with time samples in the rectangle 1208 according to:

$$E_{max}(x_r, y_r, W_m | Z_n) = \max_{t}\{E(x_r, y_r, t_j \in W_m | Z_n)\} \quad (12a)$$

The quantity $E_{max}(x_r, y_r, W_m | Z_n)$ represents the maximum energy difference for the r-th trace in the time window 1208. In FIG. 12B, open circles identify the maximum energy difference in each trace. For example, open circle 1210 identifies the maximum energy difference $E_{max}(x_9,y_9,W_m|Z_n)$ of the seven energy differences located along the 9-th trace with time samples in the time window 1208. The maximum energy differences in the time window $W_m$ are collected to form a vector of maximum energy-differences given by:

$$\vec{E}_{max}(W_m|Z_n) = [E_{max}(x_1,y_1,W_m|Z_n) \ldots E_{max}(x_R,y_R, W_m|Z_n)]^T \quad (12b)$$

For example, in FIG. 12B, vector 1212 represents the vector of maximum energy-differences for the time window 1208.

FIG. 12C shows the time windows shown in FIG. 12A with corresponding vectors of maximum energy differences computed for each time window. For example, time window $W_1$ has associated vector of maximum energy differences, $\vec{E}_{max}(W_1|Z_n)$, and time window $W_2$ has associated vector of maximum energy differences, $\vec{E}_{max}(W_2|Z_n)$.

Figure 13:
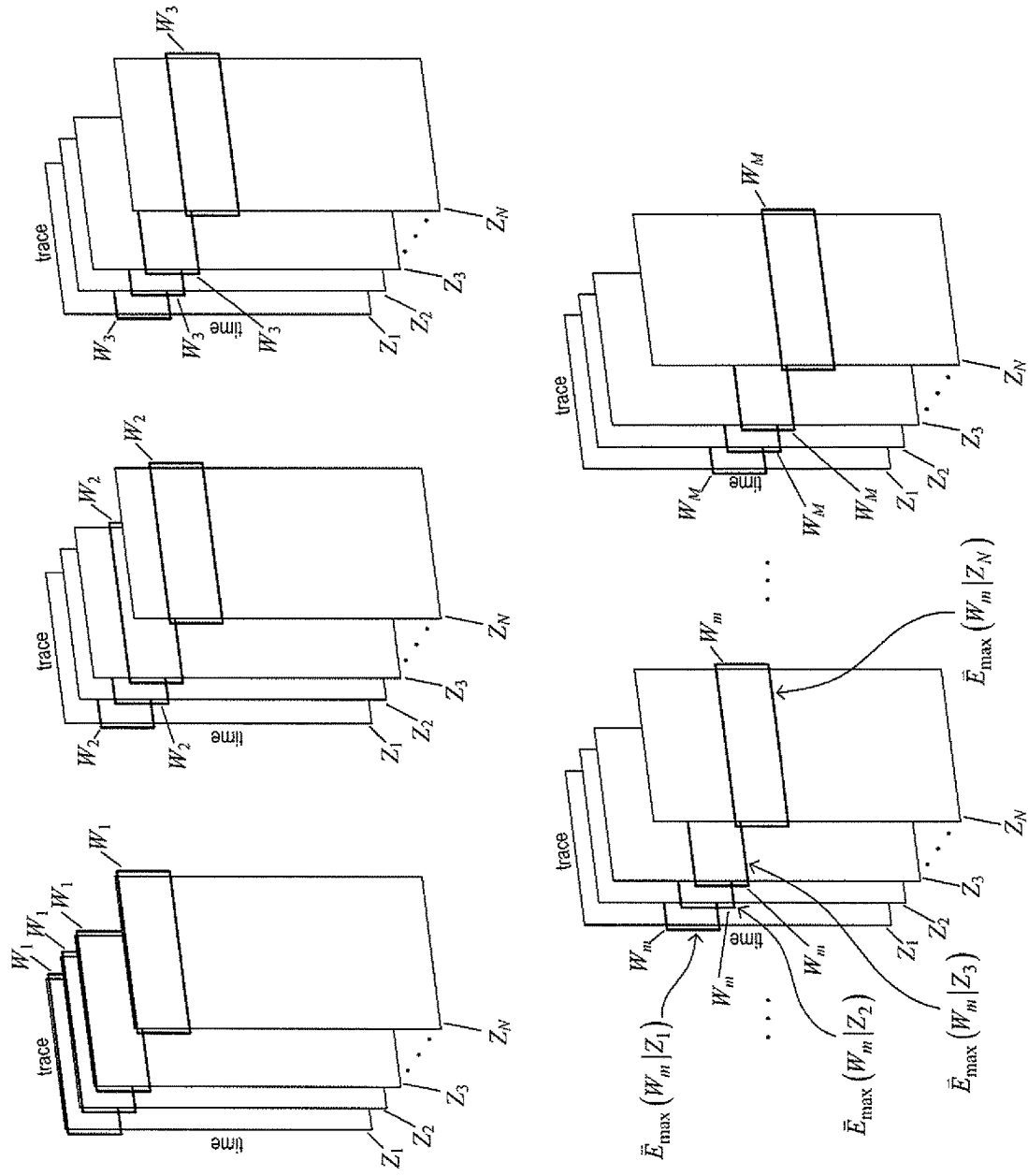
FIG. 13 shows the time windows applied to difference gathers associated with different trial depths.

Next, for each time window applied to the N difference gathers, a peak energy is computed from the N vectors of maximum energy differences calculated for the time window. FIG. 13 shows the M time windows applied to the N difference gathers, each of which is identified by a trial depth $Z_n$. For example, time window $W_m$ is applied to each of the N difference gathers over the same time interval and a vector of maximum energy difference $\vec{E}_{max}(W_m|Z_n)$ is computed for each of the N difference gathers. The maximum energy differences of the vectors of maximum energy differences formed for the time window $W_m$ applied to each of the N difference gathers are collected to form a set of maximum energy differences $\{E_{max}(x_r,y_r,W_m|Z_n)\}$ for r=1, ..., R and n=1, ..., N. For each time window $W_m$, a peak energy is then identified from the set of maximum energy differences $$E_{peak}(x_r, y_r, z_{peak,r}) = \max_{n}\{E_{max}(x_r, y_r, W_m | Z_n)\} \quad (13)$$

where $z_{peak,r}$ equals the trial depth $Z_n$ of the maximum energy difference in the set $\{E_{max}(x_r,y_r,W_m|Z_n)\}$.

Each maximum energy difference $E_{max}(x_r,y_r,W_m|Z_n)$ in the set $\{E_{max}(x_r,y_r,W_m|Z_n)\}$ corresponds to a receiver as described above with reference to FIG. 12B. As a result, receiver coordinates $(x_r,y_r)$ associated with the peak energy $E_{peak}(x_r,y_r,z_{peak,r})$ are the receiver coordinates associated with $z_{peak,r}$, which includes the subscript r to identify the receiver. The peaks $z_{peak,r}$ and associated receiver coordinates $(x_r,y_r)$ are collected to form a set of points $\{(x_r,y_r,z_{peak,r})\}$ that approximate the shape of the frozen free-surface above the streamer.

Figure 14:
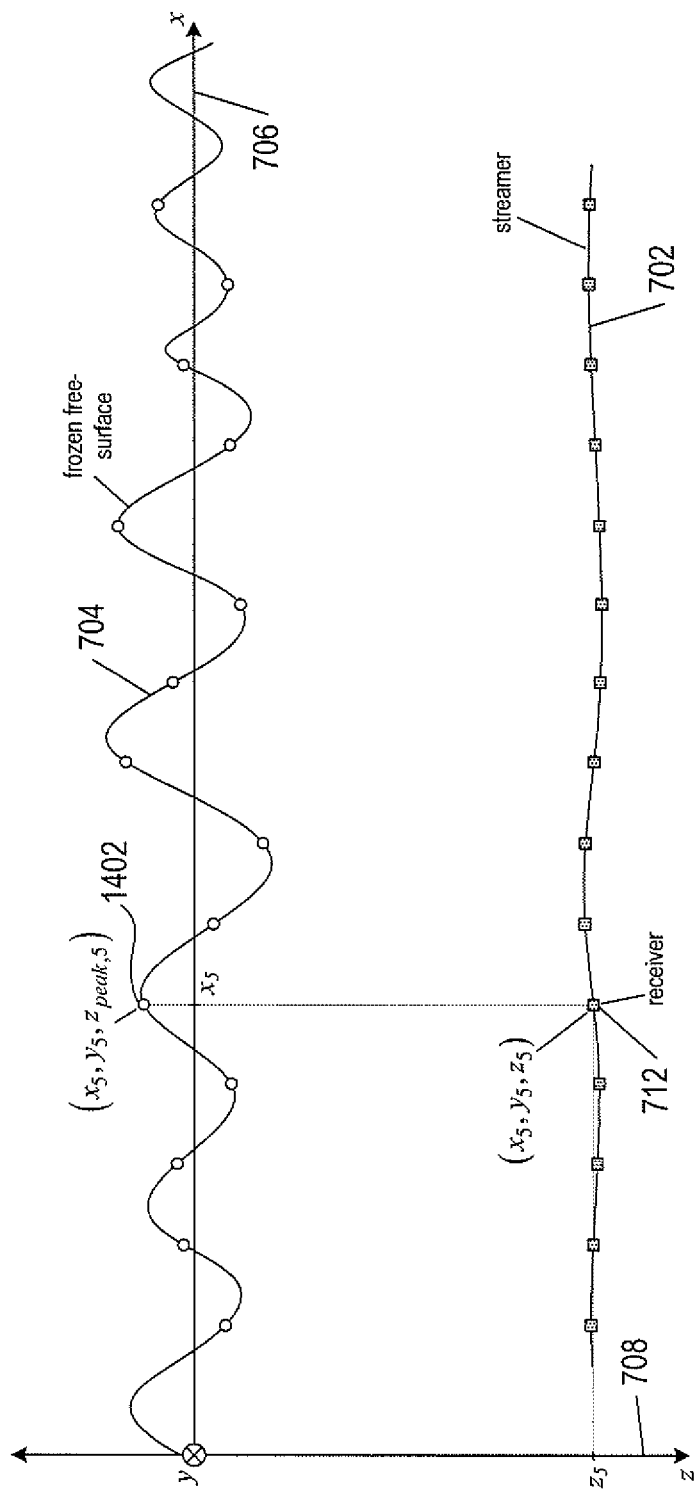
FIG. 14 shows a side-elevation view of a set of points above receivers that approximate a frozen free-surface.

FIG. 14 shows a side-elevation view of the streamer 702 and frozen free-surface 704 described above with reference to FIG. 7. Open circles located along the frozen free-surface 704' above the receivers represent points in the set $\{(x_r,y_r,z_{peak,r})\}$. For example, open circle 1402 represent a point $(x_5,y_5,z_{peak,5})$ along the frozen free-surface 704' above the fifth receiver 712 with receiver coordinates $(x_5,y_5,z_5)$.

Implementations are not limited to generating a difference gather as described above with reference to FIG. 11. In alternative implementations, two separate time windows may be applied to the same time intervals of corresponding forward and backward extrapolated gathers and calculation of amplitude differences is limited to the amplitudes within the two time windows.

Figure 15:
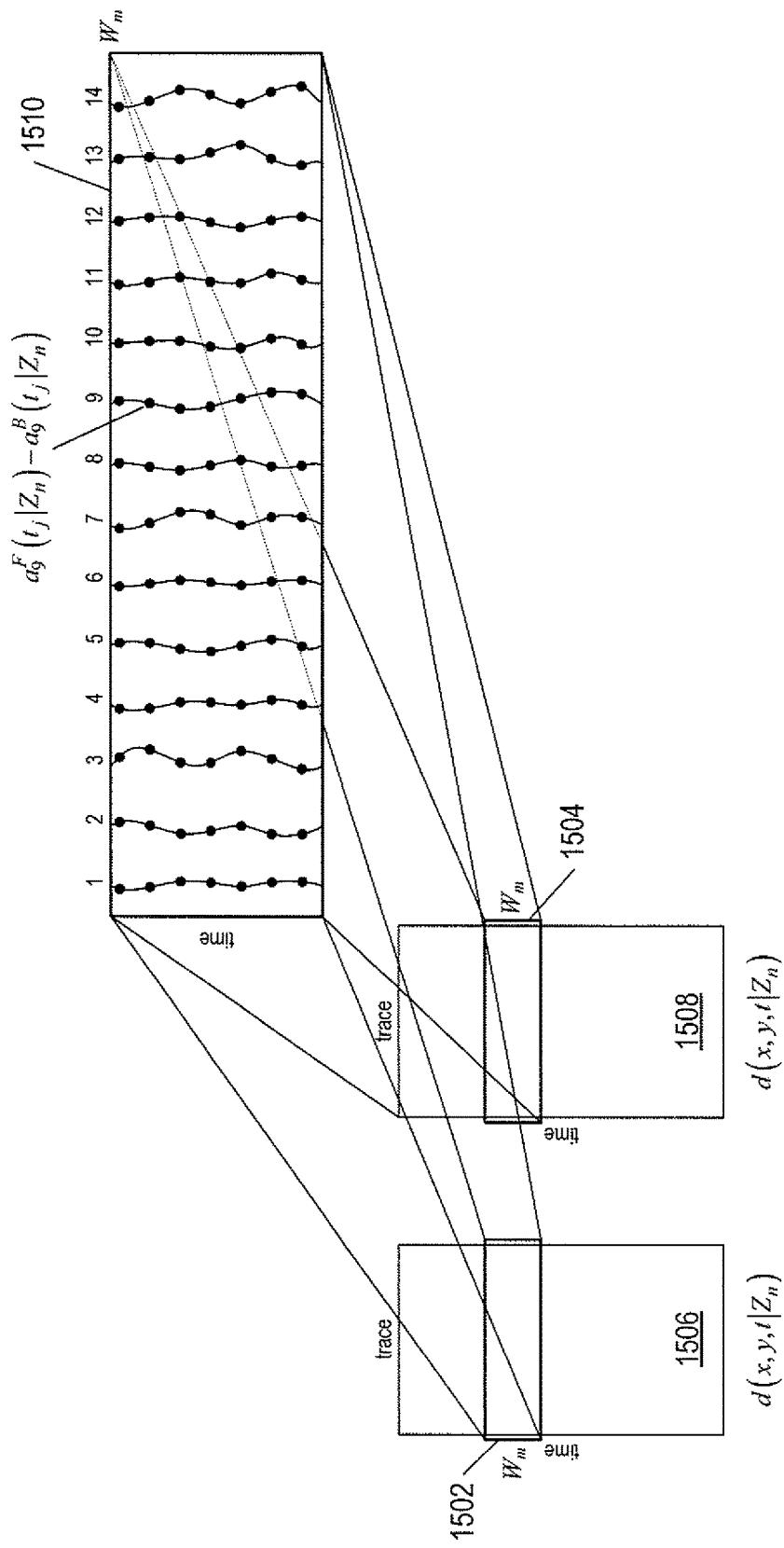
FIG. 15 shows an example calculation of amplitude differences for two separate time windows.

FIG. 15 shows an example calculation of amplitude differences for two separate time windows 1502 and 1504 applied to the same time intervals of forward and backward extrapolated gathers 1506 and 1508. In this example, the forward and backward extrapolated gathers 1506 and 1508 represent the extrapolated gathers used to compute the difference gather 1202 described above with reference to FIGS. 12A-12C. Instead of computing the entire difference gather 1202, a time window 1510 containing amplitude differences, $a_r^F(t_j|Z_n) - a_r^B(t_j|Z_n)$, of corresponding amplitudes in the two time windows 1502 and 1504 is computed for every time sample in the time window 1510. The amplitude differences in the time window 1510 correspond to the amplitude differences in the time window 1204 in FIG. 12B. The energy differences are computed for corresponding amplitude differences in the time windows 1502 and 1504 as follows:

$$E(x_r,y_r,t_j \in W_m|Z_n) = [a_r^F(t_j|Z_n) - a_r^B(t_j|Z_n)]^2 \quad (14)$$

The energy differences computed from the amplitude differences in the time window 1510 correspond to the energy differences in the time window 1208 shown in FIG. 12B and a maximum energy difference is determined for each trace as described above with reference to Equation (12b). Next, for each time window applied to the N corresponding forward and backward extrapolated gathers, a peak energy is computed as described above with reference to Equation (13) to obtain a set of points $\{(x_r,y_r,z_{peak,r})\}$ that approximate the shape of the frozen free-surface above the streamer.

The shape of the frozen free-surface above the streamer may be approximated by applying interpolation to the set of points $\{(x_r,y_r,z_{peak,r})\}$. For example, polynomial interpolation, spline interpolation, and Gaussian interpolation may be used to compute an approximate frozen free-surface profile above the streamer based on the set of points $\{(x_r,y_r,z_{peak,r})\}$.

Figure 16A:
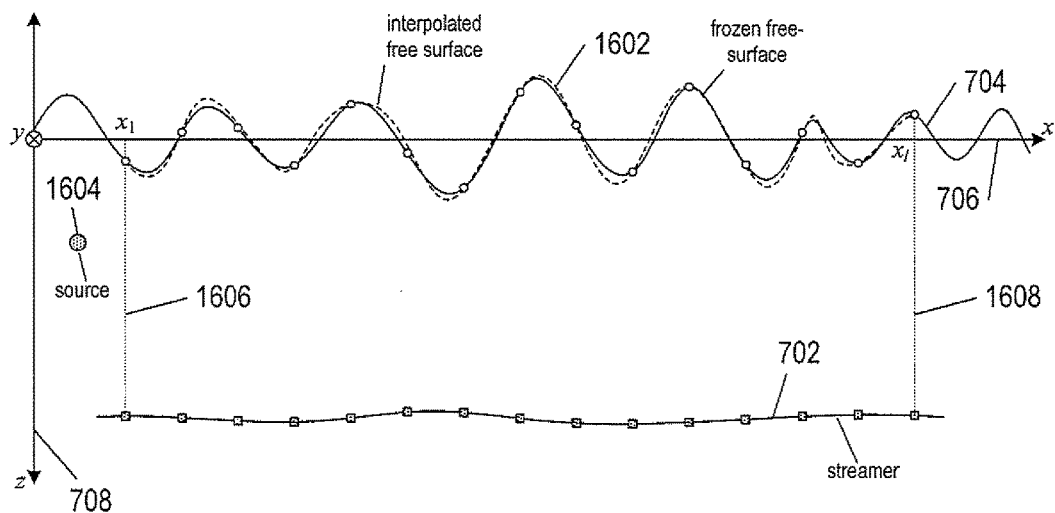
FIG. 16A shows a side-elevation view of a streamer, a frozen free-surface, and an approximate frozen free-surface profile.

FIG. 16A shows a side-elevation view of the streamer 702 and frozen free-surface 704 and open circles that represent the set of points $[(x_r,y_r,z_{peak,r})]$. Dashed curve 1602 represents an approximate frozen free-surface profile, $f_{int}(x)$, of the frozen free-surface 704 above the streamer 702 between the first receiver coordinate $x_1$ and the last receiver coordinate $x_I$ identified by dashed lines 1606 and 1608, respectively. Note that the cross-line receiver coordinate $y_r$ is suppressed, because the approximate frozen free-surface profile is determined in the in-line direction. FIG. 16A also shows a source 1604 (represented by a shaded circle) towed by a survey vessel (not shown). But the approximate frozen free-surface profile 1602 does not approximate the frozen free-surface above the source 1604. The approximate frozen free-surface profile may be extended to approximate the frozen free-surface above the source 1604 by computing a frozen free-surface extension.

Figure 16B:
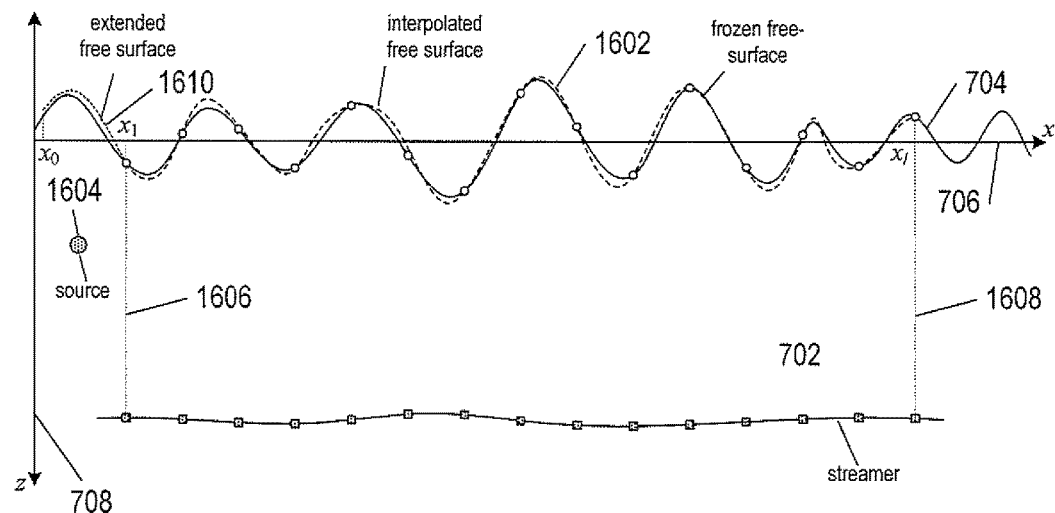
FIG. 16B shows a plot of an extended portion of the approximate frozen free-surface profile shown in FIG. 16A.

FIG. 16B shows a plot of an extended portion of the approximate frozen free-surface profile. Dotted curve 1610 represents an approximate frozen free-surface extension above the source 1604. The frozen free-surface extension 1610 may be calculated from a free-surface model based on parameters associated with the weather conditions measured at the time of the marine survey. For example, a Pierson- Moskowitz model of the free-surface may be used to calculate the frozen free-surface extension 1610. The Pierson-Moskowitz model of a free-surface is based on the wind blowing steadily for a long period of time over a large free-surface area to produce waves that eventually reach a state of equilibrium. This condition is referred to as a "fully developed sea." The Pierson-Moskowitz model used to calculate an extension to the approximate frozen free-surface profile at a point x in the x-direction is given by:

$$f_{ext}(x) = \frac{1}{L}\sum_{q=0}^{Q-1} F(K_q)e^{iK_q x} \quad (15)$$

where for the integer index $q \geq 0$, $$F(K_q) = \sqrt{2\pi LW(K_q)} \begin{cases} [N(0,1) + jN(0,1)]/\sqrt{2} & \text{for } i \neq 0, Q/2 \\ N(0,1) & \text{for } i = 0, Q/2 \end{cases} \quad (16)$$

and for $q < 0$, $F(K_q) = F(K_{-q})^*$.

The parameter $W(K_q)$ is the Pierson-Moskowitz spatial roughness spectrum, which for a fully developed sea surface in one-dimension (e.g., x-direction) is given by:

$$W(K_q) = \left[\frac{\alpha}{4|K_q|^3}\right]\exp(-\beta g^2/K_q^2 U_w^4) \quad (17)$$

where
$K_q$ is the spatial wavenumber;
$U_w$ is the wind speed measured at a height of about 19 meters;
$\alpha$ is $8.0 \times 10^{-3}$;
$\beta$ is 0.74; and
g is the acceleration due to gravity.
In Equations (15) and (16), the spatial wavenumber for component q is given by $K_q = 2\pi q/L$, where L is the length of free-surface. The random number $N(0,1)$ may be generated from a Gaussian distribution having zero mean and a unit variance. As a result, the free-surface is formed by adding each wavenumber component imposing random phase shifts. A frozen in time Pierson-Moskowitz free-surface may be computed from Equation (15) using a FFT for computational efficiency.

The frozen free-surface extension $f_{ext}(x)$ may be combined with the approximate frozen free-surface profile $f_{int}(x)$ to represent the frozen free-surface above the source and receivers by $$f(x) = \begin{cases} f_{ext}(x) & \text{for } x_0 \leq x < x_1 \\ f_{int}(x) & \text{for } x_1 \leq x \leq x_l \end{cases} \quad (18)$$

When extending the approximate frozen free-surface profile to approximate the frozen free-surface above the source 1604, the approximate frozen free-surface profile f(x) reduces to $f_{int}(x)$.

In alternative implementations, the approximate frozen free-surface extension may be expanded to include a time parameter that characterizes the frozen free-surface at different times. Free-surface waves are generally dispersive and in deep water, and the frequency and wavenumber are related by a dispersion relation given by:

$$\Omega(K_q) = \sqrt{gK_q} \quad (19)$$

Equation (19) implies that each spatial harmonic component of the free-surface wavefield may move with a definite phase velocity. As a result, in general, free-surface waves of longer wavelengths travel faster relative to waves with shorter wavelengths. Combining Equations (15) and (19) gives a time-varying frozen free-surface:

$$f_{ext}(x, t) = \frac{1}{L}\sum_{q=0}^{Q-1} F(K_q)e^{i(K_q x - \Omega(K_q)t)} \quad (20)$$

where t is instantaneous time. Equation (20) characterizes a one-dimensional rough free-surface moving in the positive x-direction and may be used to compute the frozen free-surface extension 1610 at earlier or later times.

Consider a free-surface shape at an instant in time t with wave heights given by Equation (20). The wavenumber spectrum $F(K_q)$ of the free-surface is computed according to Equation (16) and an arbitrary known dispersion relation $\Omega(K_q)$ is calculated according to Equation (19) may be used to calculate the frozen free-surface at an earlier (t−Δt) or a later (t+Δt) time by:

$$f_{ext}(x, t) = \frac{1}{L}\sum_{q=0}^{Q-1} F(K_q)e^{i(K_q x - \Omega(K_q)\Delta t)} \quad (21)$$

Figure 17:
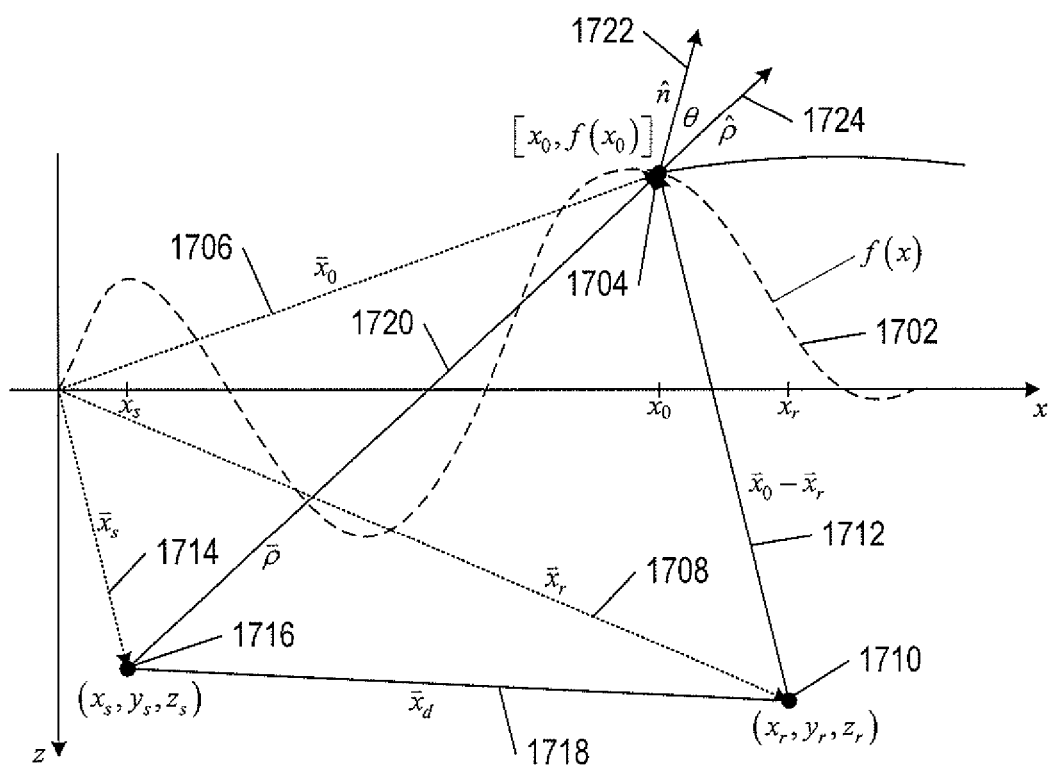
FIG. 17 shows a plot of frozen free-surface wavefield reflectivity parameters.

The frozen free-surface wavefield reflectivity (i.e., the response of a unit point source at the receiver position $\vec{r}_r$) may be computed for a source at a location $\vec{x}_s = (x_s, y_s, z_s)$ and a receiver at a location $\vec{x}_r = (x_r, y_r, z_r)$ using:

$$R(\vec{x}_r, \vec{x}_s) = \frac{1}{4j}H_0^{(1)}(k|\vec{x}_d|) + \frac{k}{8}\int_{S_r} H_0^{(1)}(k|\vec{x}_0 - \vec{x}_r|)H_1^{(1)}(k|\vec{\rho}|)\eta(x')\,dx' \quad (22)$$

with $$\eta(x') = \frac{-(x'-x_s)\frac{df(x)}{dx}\bigg|_{x=x'}}{|\vec{\rho}|} + \frac{[f(x') - z_s]}{|\vec{\rho}|}$$

where $$H_n^{(1)}(x) \cong \sqrt{\frac{2}{\pi x}}\exp\left(i\left(x - \frac{\pi}{4} - \frac{n\pi}{2}\right)\right)$$

is the asymptotic form of the first-order Hankel function with n=0 and 1. The parameters of Equation (22) are represented in FIG. 17 as follows:
k is the wavenumber of the propagating wavefield;
f(x) is the approximate frozen free-surface profile represented by dashed curve 1702;
$[x_0, f(x_0)]$ is a coordinate position 1704 of a running scattering point on the approximate frozen free-surface profile;

$\vec{x}_0$ is a vector 1706 from the origin of the Cartesian coordinate system to the running scattering point 1704;

$\vec{r}_r$ is a vector 1708 from the origin to a receiver 1710;

$\vec{x}_0 - \vec{x}_r$ is a vector 1712 from the running scattering point 1704 to the receiver 1710;

$\vec{x}_d$ is a vector 1714 from the origin to a source 1716;

$\vec{x}_d$ is a vector 1718 from the source 1716 to the receiver 1710;

$\vec{\rho}$ is a vector 1720 from the source 1716 to the scattering point 1704;

$S_r$ is the path of the streamer which may be interpolated from the depth measurements obtained from the depth measuring devices location along the streamer; and $\eta(x') = \hat{n} \cdot \hat{\rho} = \cos\theta$ is the obliquity factor with normal vectors $\hat{n}$ 1722 and $\hat{\rho}$ 1724 corresponding to the frozen free-surface normal and the unit vector direction of the incident field at $[x_0, f(x_0)]$ 1704 and $\theta$ is the angle between the vectors $\hat{n}$ 1722 and $\hat{\rho}$ 1724.

Figure 18A:
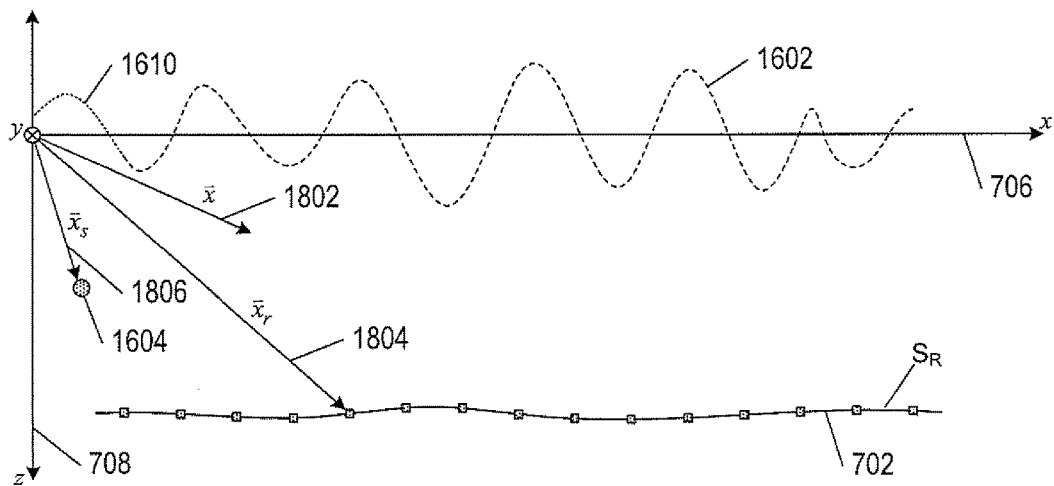
FIGS. 18A-18B shows example side-elevation views of a source depth relative to streamer depth.
Figure 18B:
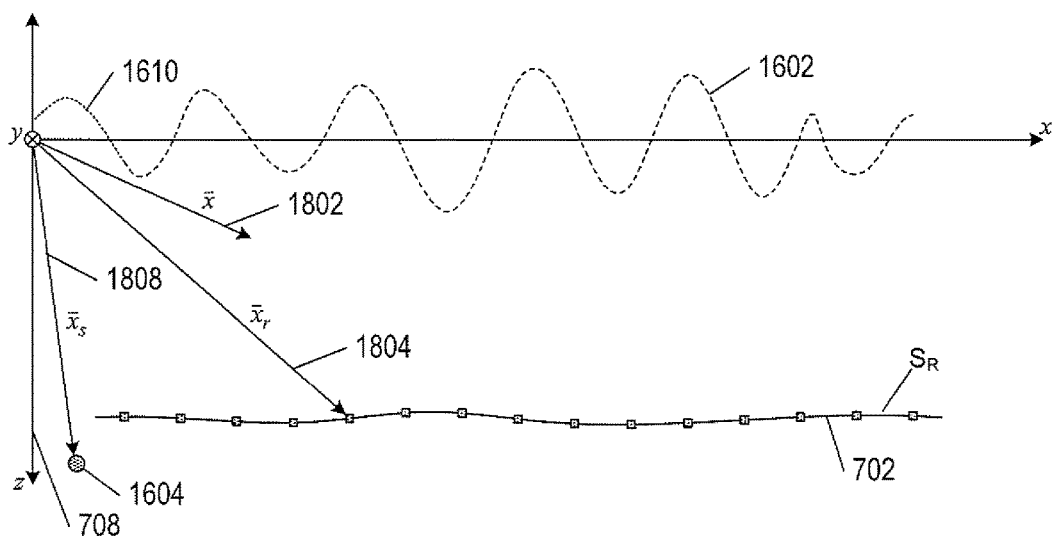

Next, the gradient of the pressure wavefield in the frequency domain, denoted by $\nabla_r P$, may be computed. Computation of the gradient $\nabla_r P$ generally depends on the depth of the source in relation to the depth of the streamer. FIG. 18A shows an example side-elevation view of the source 1604 located shallower than the streamer 702, and FIG. 18B shows an example side-elevation view of the source 1604 located deeper than the streamer 702. In FIGS. 18A-18B, vectors, such as vector $\vec{x}$ 1802, represent coordinates (x,y,z). Subscript-r vectors, such as vector $\vec{r}^r$ 1804, represent receiver coordinates $(x_r, y_r, z_r)$, and subscript-s vectors, such as vector $\vec{r}_s$ in FIG. 18A and vector $\vec{x}_s$ 1808 in FIG. 18B represent source coordinates $(x_s, y_s, z_s)$. When the depth of the source 1604 is less than the depth of the streamer, as shown in FIG. 18A, the gradient of the pressure wavefield may be calculate by solving the following integral equation for $\nabla_r P(\vec{x}_r, \omega)$ in the frequency domain:

$$\int_{S_r} dS_r \vec{n} \cdot R(\vec{x}_r, \vec{x}) \nabla_r P(\vec{r}_r, \omega) = a(\omega) R(\vec{x}_s, \vec{x}) + \int_{S_r} dS_r \vec{n} \cdot P(\vec{x}_r, \omega) \nabla_r R(\vec{x}_r, \vec{x}) \quad (23)$$

where $a(\omega)$ is the Fourier transform of the source-time function for the source at the coordinate location $\vec{x}_s$;

$P(\vec{x}_r, \omega)$ is the pressure wavefield data in the frequency domain obtained from transforming the pressure wavefield data $p(\vec{x}_r, t)$ using an FFT or a DFT.

$R(\vec{x}, \vec{x}_s)$ is the frozen free-surface reflectivity calculated according to Equation (22);

$\nabla_r R(\vec{x}_r, \vec{x})$ is the radient of the reflectivity; and $\nabla_r R(\vec{x}_r, \omega)$ is the gradient of the pressure wavefield at the receiver.

Equation (23) is a Fredholm integral equation of the first kind for the gradient of the pressure wavefield $\nabla_r P(\vec{x}_r, \omega)$ where the right-hand side of Equation (23) contains only known parameters such as the pressure wavefield $P(\vec{x}_r, \omega)$ and the free-surface wavefield reflectivity $R(\vec{x}_r, \vec{x})$. The gradient of the reflectivity, $\nabla_r R(\vec{x}_r, \vec{x})$, may be computed using numerical gradient techniques applied to the free-surface wavefield reflectivity $R(\vec{x}_r, \vec{x})$ in Equation (22). On the other hand, when the source is located at a depth below the streamer $S_r$, as shown in FIG. 18B, the expression used to calculate the gradient of the pressure wavefield $\nabla_r P(\vec{x}_r, \omega)$ over the frequency range is give by:

$$\int_{S_r} dS_r \vec{n} \cdot R(\vec{x}_r, \vec{x}) \nabla_r P(\vec{x}_r, \omega) = \int_{S_r} \vec{n} \cdot P(\vec{x}_r, \omega) \nabla_r R(\vec{x}_r, \vec{x}) \quad (24)$$

In Equation (24), the source function $a(\omega)$ is zero. Note that the solutions of Equations (23) and (24) become unstable when the spectrum of the pressure wavefield has very small values (e.g., close to receiver ghost notches).

Depending on whether the source is at a depth above or below the streamer, as shown in FIGS. 18A and 18B, respectively, Equations (23) and (24) may be solved numerically for the gradient of the pressure wavefield, $\nabla_r P(\vec{x}_r, \omega)$ at receiver locations along the streamer using quadrature or expansion methods. For quadrature methods, the integrals may be approximated by quadrature formulas and the resulting system of algebraic equations is solved. For expansion methods, the solution may be approximated by an expansion in terms of basis functions.

An approximate normal particle velocity at each receiver location along the streamer may be calculated according to:

$$\tilde{V}_n(\vec{x}_r, \omega) = -\frac{i}{\rho\omega} \vec{n} \cdot \nabla_r P(\vec{x}_r, \omega) \quad (25)$$

where $\vec{n}$ is a normal vector at a receiver; and $\vec{n} \cdot \nabla_r P(\vec{x}_r, \omega)$ is the normal derivative of the pressure wavefield P at the receiver.

Figure 19:
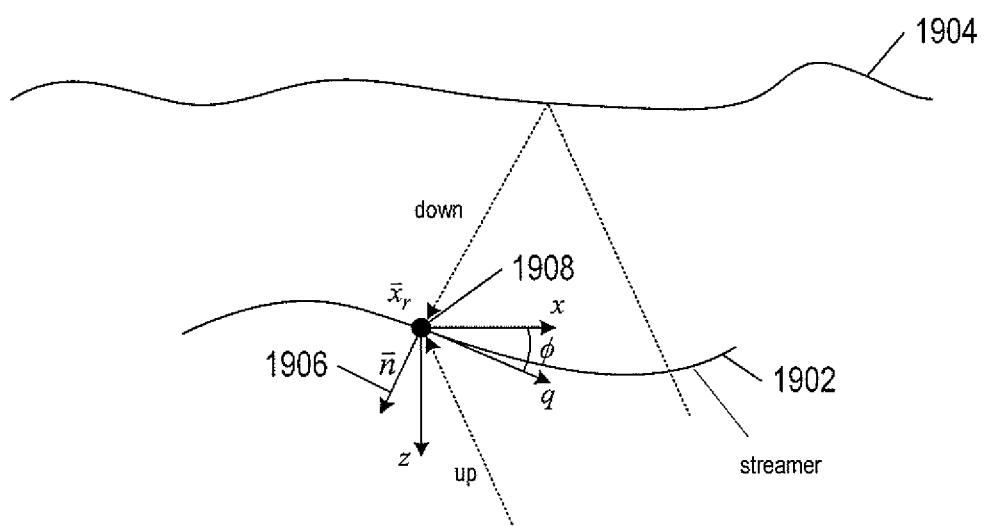
FIG. 19 shows a segment of a streamer located beneath an approximate frozen free-surface profile.

FIG. 19 shows a segment of a streamer 1902 located beneath an approximate frozen free-surface profile 1904 in the xz-plane. A normal vector 1906 to the streamer 1902 at the receiver 1908 is given by:

$$\vec{n} = (n_x, n_z) = (-\sin\phi, \cos\phi) = \left(-\frac{dz_r}{dx}, \frac{dx_r}{dq}\right) \quad (26)$$

The resulting approximate vertical particle velocity for each receiver is given by:

$$\tilde{V}_z(\vec{x}_r, \omega) = \cos\phi \cdot \tilde{V}_n(\vec{x}_r, \omega) \quad (27)$$

The approximate vertical particle velocity $\tilde{V}_z(\vec{x}_r, \omega)$ may be transformed from the space-frequency domain to the f-k domain using an FFT or DFT to obtain $\tilde{V}_z(\vec{k}, \omega)$, where $\vec{k}$ is the wavevector (i.e., $\vec{k} = (k_x, k_y, k_z)$), which may be used to compute separate approximate up-going and down-going pressure wavefields according to Equations (4a) and (4b).

Figure 20:
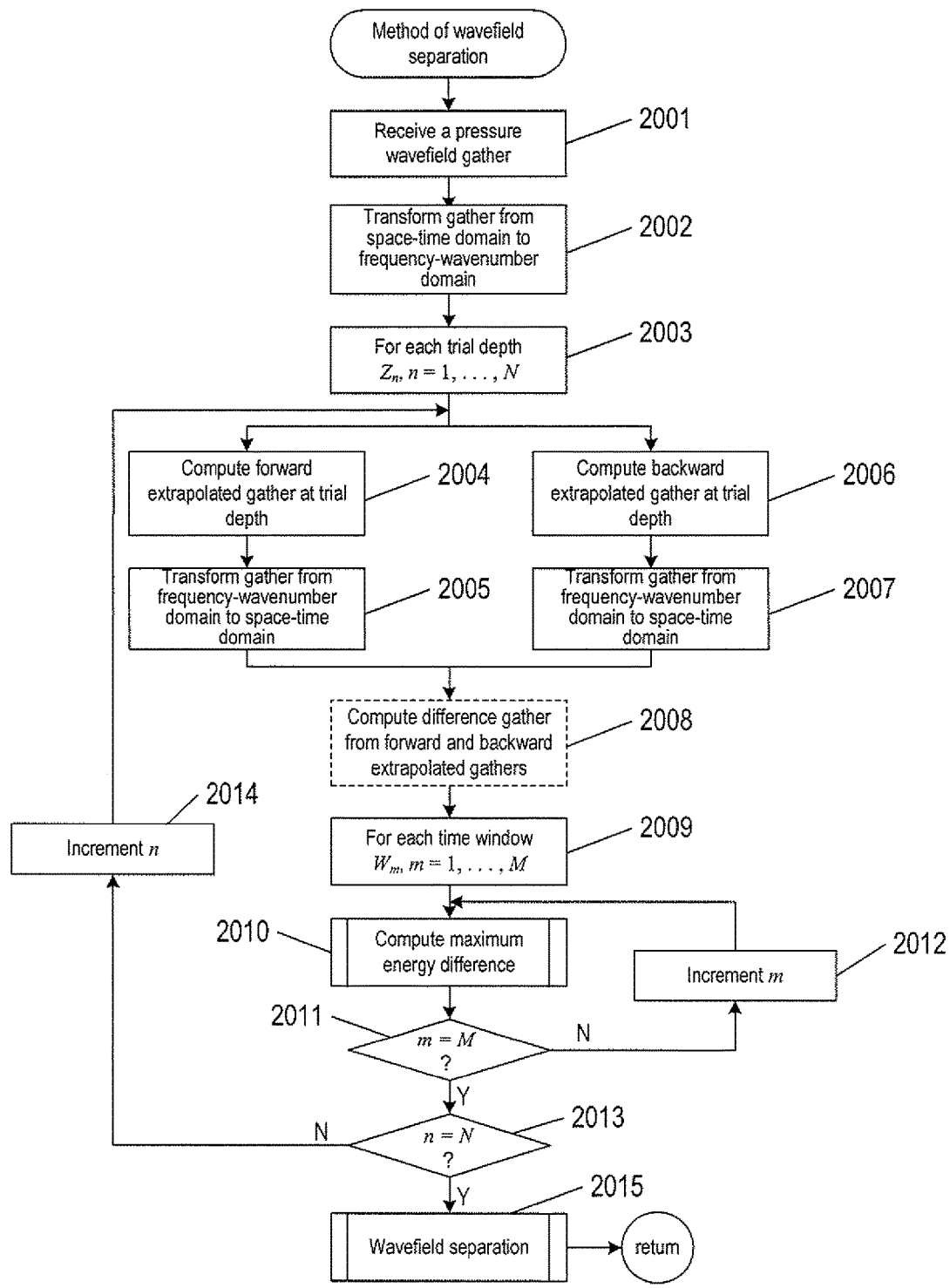
FIG. 20 shows a flow-control diagram of a method that computes separated wavefields from measured pressure wavefields.

FIG. 20 shows a flow-control diagram of a method that computes separated wavefields from measured pressure wavefields. In block 2001, a gather of pressure wavefield data is received. The gather may be a common-shot gather of pressure wavefield data obtained from receivers located along a streamer of a data acquisition surface, as described above with reference to FIG. 3. In block 2002, the gather may be transformed from the s-t domain to the f-k domain as described above with reference to Equation (5). A for-loop beginning with block 2003 repeats the computational operations of blocks 2004-2014 for N trial depths. In block 2004, a forward extrapolated wavefield computed for a trial depth $z_n$, as described above with reference to Equation (6). In block 2005, the forward extrapolated wavefield is transformed from f-k domain back to the s-t domain as described above with reference to Equation (8a) using an FFT or a DFT to obtain a forward extrapolated wavefield in the s-t domain. In block 2006, a backward extrapolated wavefield computed for a trial depth $z_{n_t}$ as described above with reference to Equation (6). In block 2007, the backward extrapolated wavefield is transformed from f-k domain back to the s-t domain as described above with reference to Equation (8a) using an FFT or a DFT to obtain a backward extrapolated wavefield in the s-t domain. In block 2008, a difference gather is computed from the forward and back extrapolated wavefields as described above with reference to Equation (10) and with reference to FIG. 11. A for-loop beginning with block 2009 repeats the computational operations of blocks 2010-2012 for a series of time windows as described above with reference to FIGS. 12A-12C. In block 2010, a routine "compute maximum energy difference" is called as described below with reference to FIG. 21. In decision block 2011, when window index m equals the number M of windows in the time window series, control flows to decision block 2012. Otherwise, control flows to block 2012 and the window index is incremented and the operation represented by block 2010 is repeated. In decision block 2013, when trial depth index n equals the number N of trial depth in the series of trial depths, control flows to block 2015. Otherwise, the method increments the trial depth index n in block 2014 and repeats the operations represented by blocks 2004-2012. In block 2015, a routine "wavefield separation" is called as described below with reference to FIG. 22.

In an alternative implementation to the method represented in FIG. 20, the computational operation represented by block 2008 may be omitted. Rather than computing a difference gather from the forward and backward extrapolated wavefields, difference amplitudes may be calculate for each time of the series of time windows after block 2009, as described above with reference to FIG. 15.

Figure 21:
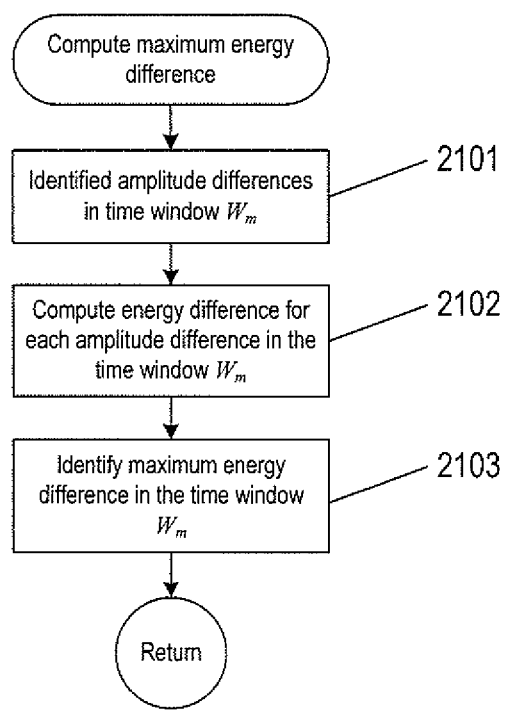
FIG. 21 shows a flow-control diagram of the routine "compute maximum energy difference" called in block 2010 of FIG. 20.

FIG. 21 shows a flow-control diagram of the routine "compute maximum energy difference" called in block 2010 of FIG. 20. In block 2101, amplitude differences in a time window $W_m$ are identified. In block 2102, energy differences are calculated for each amplitude difference in the time window $W_m$, as described above with reference to FIG. 12B and FIG. 15. In block 2103, a maximum energy difference for the time window $W_m$ is identified as described above with reference to Equation (12).

Figure 22:
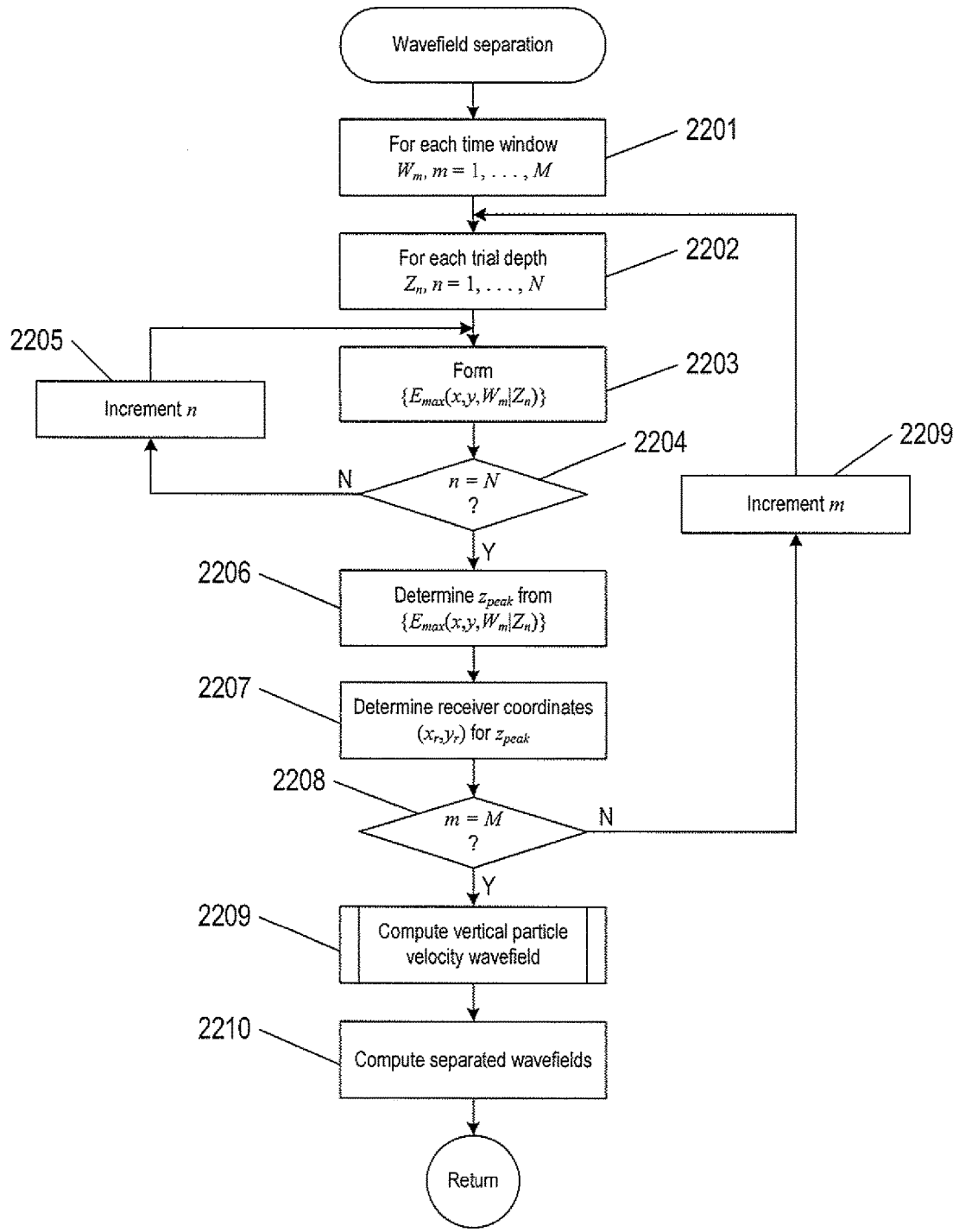
FIG. 22 shows a flow-control diagram of the routine "wavefield separation" called in block 2015 of FIG. 20.

FIG. 22 shows a flow-control diagram of the routine "wavefield separation" called in block 2015 of FIG. 20. A for-loop beginning with block 2201 repeats the computational operations represented by blocks 2202-2209 for each time window. A for-loop beginning with block 2202 repeats the computational operations represented by blocks 2203-2205 for each trial depth. In block 2203, a set of maximum energy differences is formed as described above with reference to FIG. 13. In block 2204, when the trial depth index n does not equal the number of trial depths, control flows to block 2205 in which the trial depth index is incremented and the operation represented by block 2203 is repeated. Otherwise, control flows to block 2206 and a peak trial depth is determined as described above with reference to Equation (13). In block 2207, receiver coordinates associated with the peak trial depth are determined as described above with reference to FIG. 14. In decision block 2208, when the time window index in does not equal the number of time windows in the time window series M, control flows to block 2209 and the time window index is incremented and the operations represented by blocks 2202-2208 are repeated. In block 2209, a routine "compute vertical particle velocity wavefield" is called to compute an approximate vertical particle velocity wavefield. In block 2210, separate wavefields are computed from the measured pressure wavefield received in block 2001 of FIG. 20 and the approximate vertical particle velocity wavefield.

Figure 23:
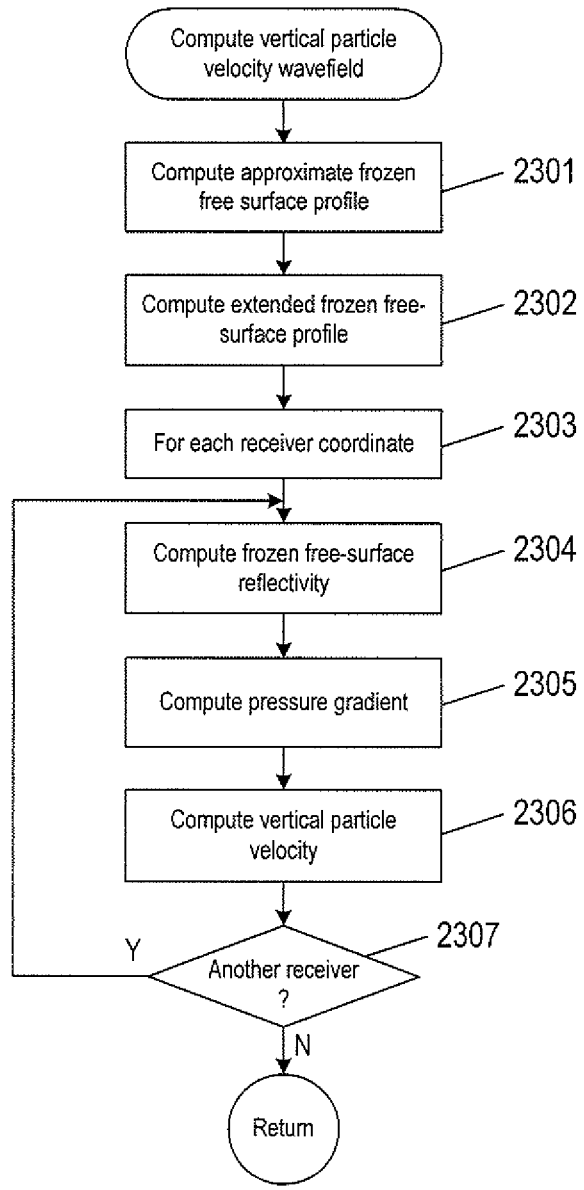
FIG. 23 shows a flow-control diagram of the routine "compute vertical particle velocity wavefield" called in block 2209 of FIG. 23.

FIG. 23 shows a flow-control diagram of the routine "compute vertical particle velocity wavefield" called in block 2209 of FIG. 23. In block 2301, an approximate frozen free-surface profile that represents a frozen in time profile of the free-surface above a streamer is computed as described above with reference to FIG. 16A. In block 2302, an approximate frozen free-surface extension is computed as described with reference to FIG. 16B and Equations (15)-(21). A for-loop beginning with block 2303 repeats the computational operations represented by blocks 2304-2307 for each receiver. In block 2304, frozen free-surface wavefield reflectivity is computed as described above with reference to Equation (22) and shown in FIG. 17. In block 2305, a pressure gradient is computed as described above with reference to Equation (23) when the source is located shallower than the streamer or computed as described above with reference to Equation (24) when the source is located deeper than the streamer. In block 2306, a vertical particle velocity is computed as describe above with reference to Equation (25). In decision block 2307, when a vertical particle velocity has not been computed for the full set of receivers that generated the measured pressure wavefield received in block 2001 of FIG. 20, the operations represented by blocks 2304-2306 are repeated.

The mathematical equations and gathers presented above are not, in any way, intended to mean or suggest an abstract idea or concept. Instead the mathematical equations and gathers described above represent actual physical and concrete concepts and properties of materials that are in existence. The mathematical equations and methods described above are ultimately implemented on physical computer hardware, data-storage devices, and communications systems in order to obtain results that also represent physical and concrete concepts of materials that are in existence. For example, as explained above, a pressure wavefield emanating from an actual subterranean formation after being illuminated with an acoustic signal is composed of actual physical pressure waves that are sampled using physical and concrete pressure sensors. The pressure sensors in turn produce physical electrical or optical signals that encode pressure wavefield data that is physically recorded on physical data storage devices and undergoes computational processing using hardware as describe above to obtain up-going wavefield data that represents physical and concrete up-going pressure and vertical particle velocity wavefields. The up-going wavefield data may be displayed, or subjected to further seismic data processing, in order to interpret the physical structure and composition of the subterranean formation, such as in monitoring production of an actual hydrocarbon deposit within the subterranean formation.

Figure 24A:
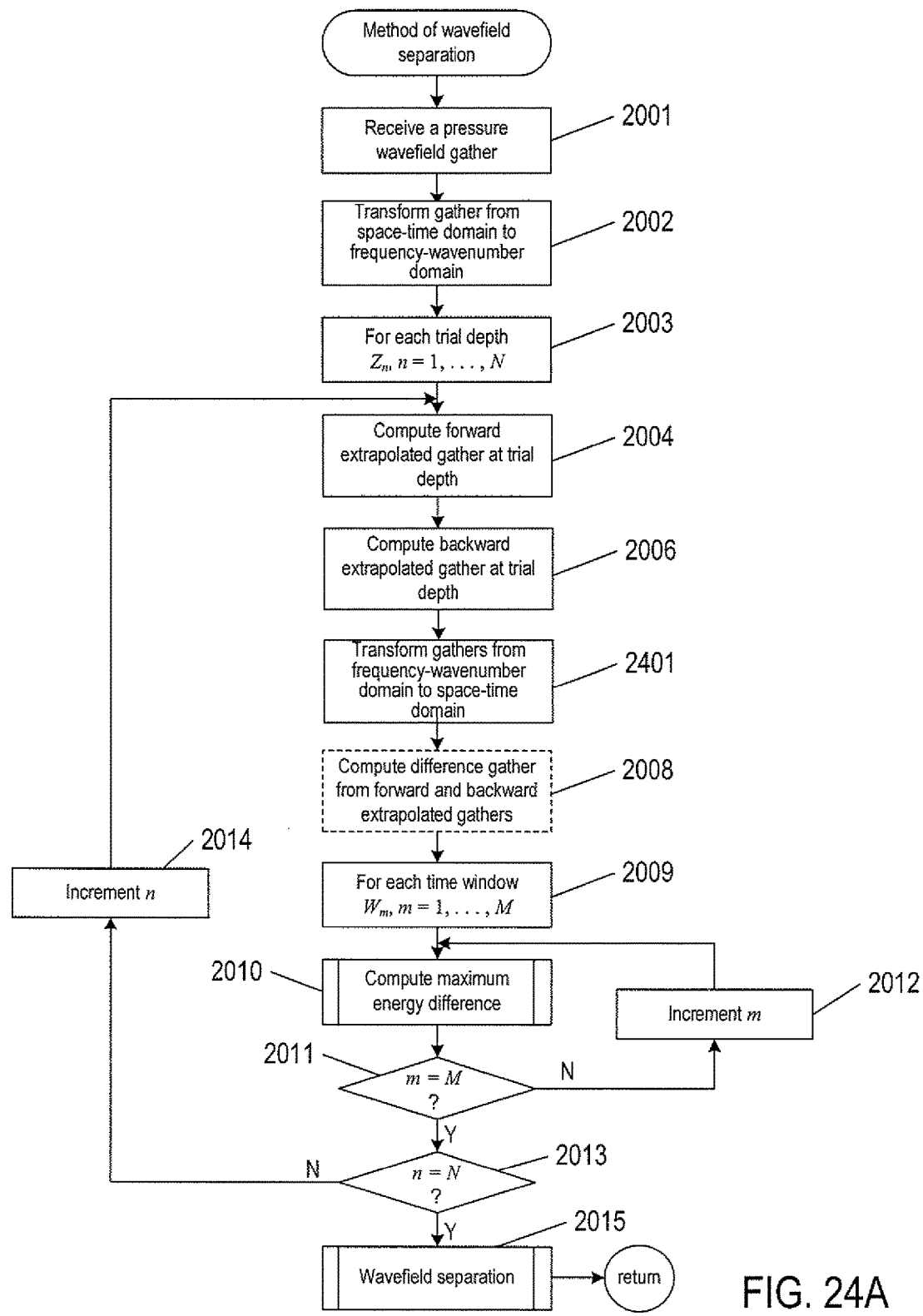
FIG. 24A-24B show flow-control diagrams of a method that computes separated wavefields from measured pressure wavefields.
Figure 24B:
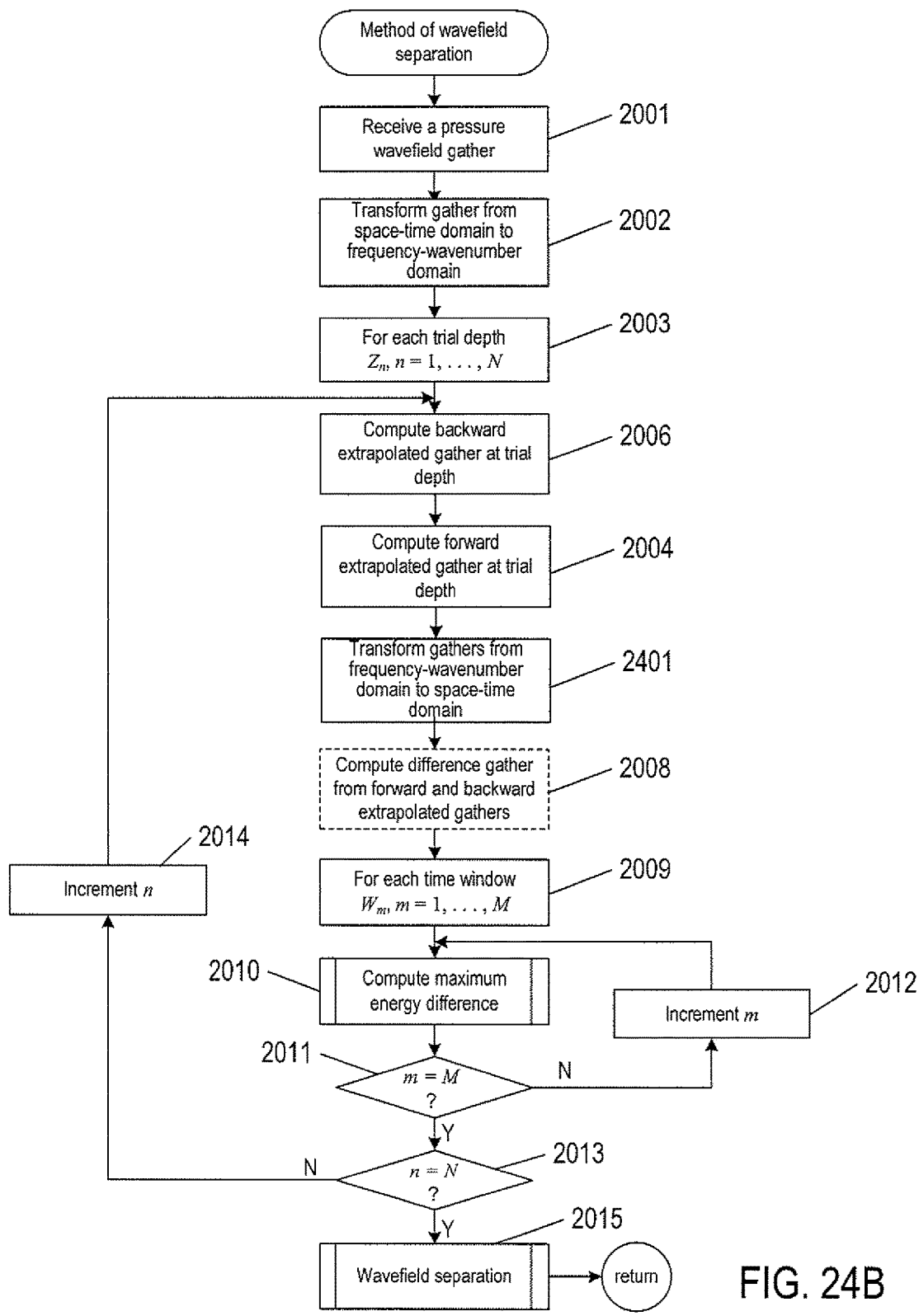

Note that in certain implementations, the computational operations represented blocks 2004-2007 may be executed in parallel as shown in FIG. 20. In other implementations, the computational operation represented by block 2004 may be executed before the computational operation represented by block 2006 followed a transformation of the gathers obtained in blocks 2004 and 2006 from the f-k domain to the s-t domain in block 2401 as shown in FIG. 24A. In still of the implementations, the computational operation represented by block 2004 may be executed after the computational operation represented by block 2006 followed a transformation of the gathers obtained in blocks 2004 and 2006 from the f-k domain to the s-t domain in block 2401 as shown in FIG. 24B.

Figure 25:
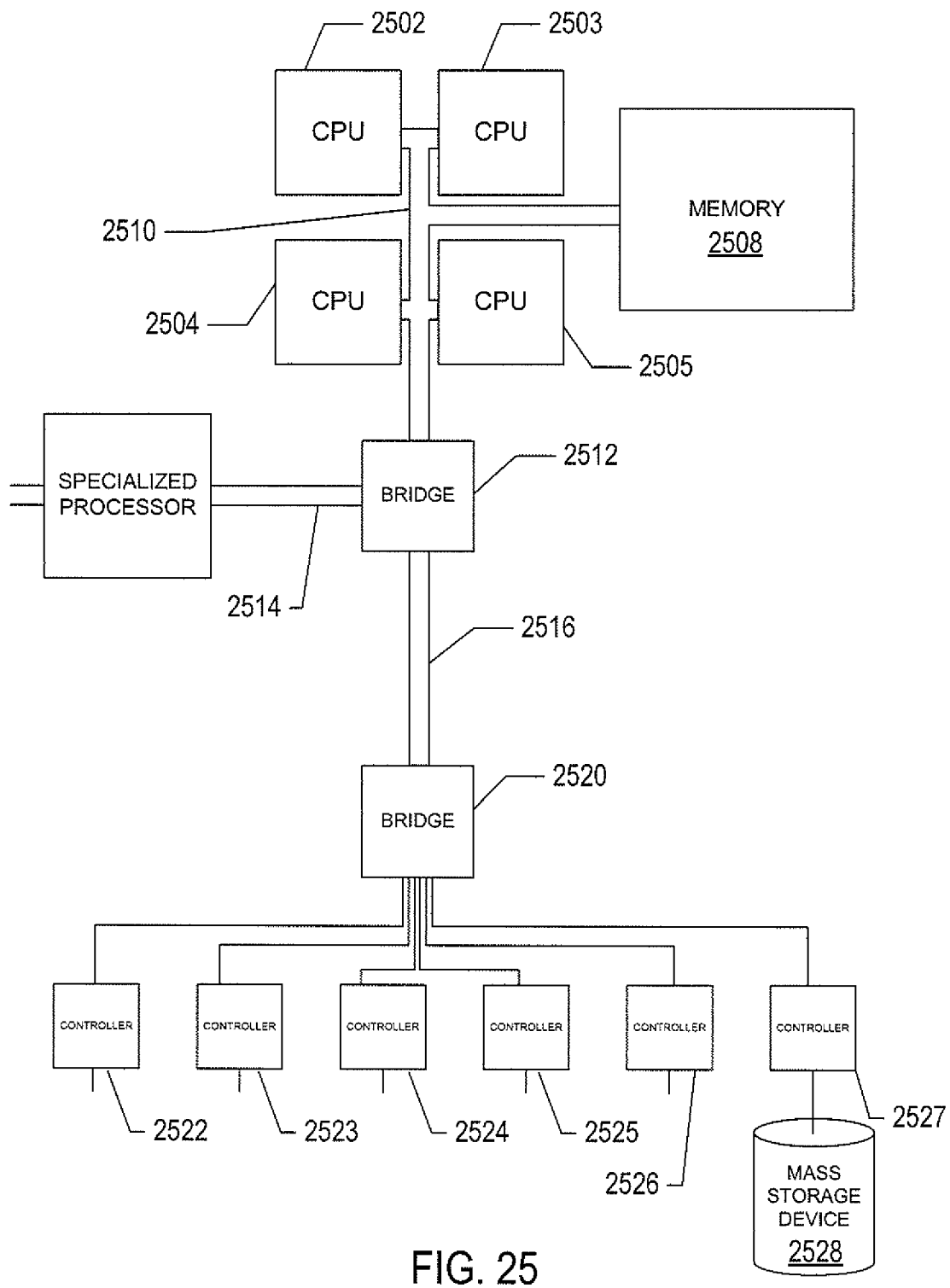
FIG. 25 shows an example of a computer system programmed to execute efficient methods of computing approximate vertical particle velocity wavefields.

FIG. 25 shows an example of a computer system programmed to execute efficient methods of computing approximate vertical particle velocity wavefields and separate up-going and down-going pressure wavefields based on measured pressure wavefields and therefore represents a geophysical-analysis data-processing system. The internal components of many small, mid-sized, and large computer systems as well as specialized processor-based storage systems may be described with respect to this generalized architecture, although each particular system may feature many additional components, subsystems, and similar, parallel systems with architectures similar to this generalized architecture. The computer system contains one or multiple central processing units ("CPUs") 2502-2505, one or more electronic memories 2508 interconnected with the CPUs by a CPU/memory-subsystem bus 2510 or multiple busses, a first bridge 2512 that interconnects the CPU/memory-subsystem bus 2510 with additional busses 2514 and 2516, or other types of high-speed interconnection media, including multiple, high-speed serial interconnects. The busses or serial interconnections, in turn, connect the CPUs and memory with specialized processors, such as a graphics processor 2518, and with one or more additional bridges 2520, which are interconnected with high-speed serial links or with multiple controllers 2522-2527, such as controller 2527, that provide access to various different types of computer-readable media, such as computer-readable medium 2528, electronic displays, input devices, and other such components, subcomponents, and computational resources. The electronic displays, including visual display screen, audio speakers, and other output interfaces, and the input devices, including mice, keyboards, touch screens, and other such input interfaces, together constitute input and output interfaces that allow the computer system to interact with human users. Computer-readable medium 2528 is a data-storage device, including electronic memory, optical or magnetic disk drive, USB drive, flash memory and other such data-storage device. The computer-readable medium 2528 can be used to store machine-readable instructions that encode the computational methods described above and can be used to store encoded data, during store operations, and from which encoded data can be retrieved, during read operations, by computer systems, data-storage systems, and peripheral devices.

Figure 26A:
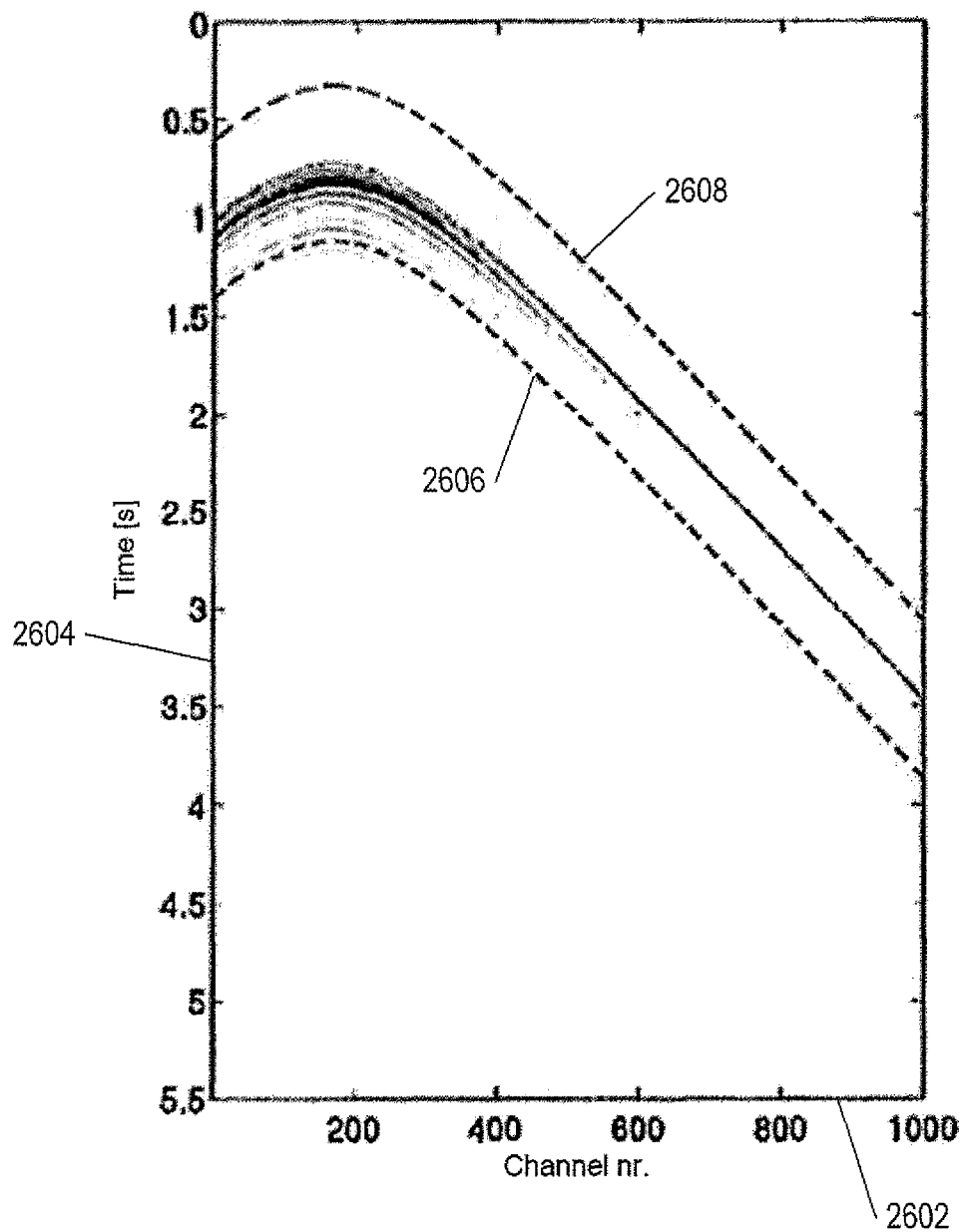
FIGS. 26A-26B show simulation results in calculating an approximation to a frozen free-surface.
Figure 26B:
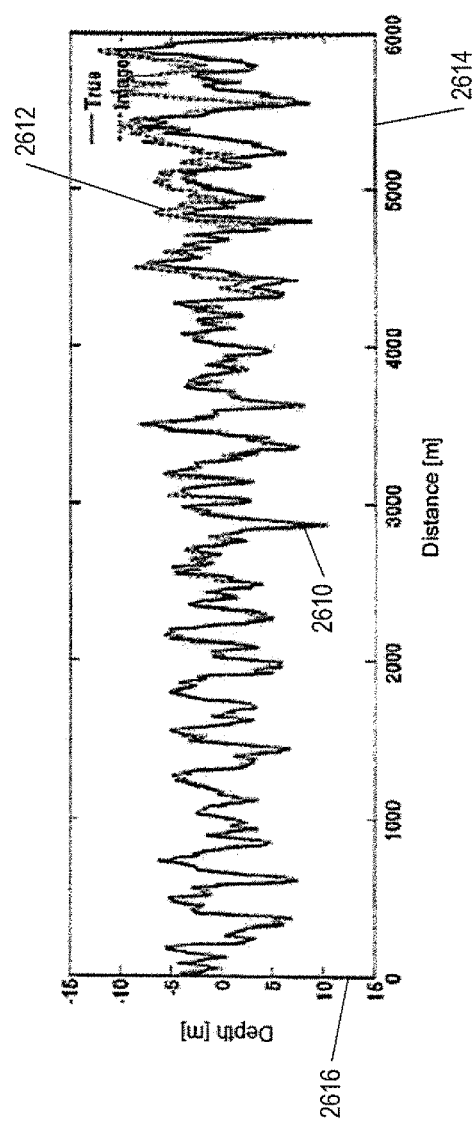

FIGS. 26A-26B show simulation results in calculating an approximation to a frozen free-surface. FIG. 26A shows a total pressure wavefield obtained from an actual numerical simulation. Horizontal axis 2602 represents channel (i.e., trace) numbers and vertical axis 2604 represents time. Dashed hyperbolic-shaped curves 2606 and 2608 identify lower and upper the hyperbolic-shaped time series boundaries. A series of time windows was applied to pressure wavefield data within the boundaries 2606 and 2608 to compute an approximate free-surface represented in FIG. 26B. FIG. 26B shows as a true free-surface represented by solid-line curve 2610 and an approximate frozen free-surface profile represented by dashed-line curve 2612. Horizontal axis 2614 represents distance along a streamer and vertical axis 2616 represents depth. Methods described above were applied to the synthetic pressure wavefield located between the boundaries 2606 and 2608 to compute the approximate frozen free-surface profile 2612, which shows a close approximation to the true free-surface distances below about 4500 meters but still tracks the overall profile of the true free-surface for distances greater than about 4500 meters.

Although the above disclosure has been described in terms of particular implementations, it is not intended that the disclosure be limited to these implementations. Modifications within the spirit of this disclosure will be apparent to those skilled in the art. For example, any of a variety of different implementations may be obtained by varying any of many different design and development parameters, including programming language, underlying operating system, modular organization, control structures, data structures, and other such design and development parameters.

The method described above may be implemented in real time while a marine survey is being conducted or subsequent to completion of the marine survey. The up-going and down-going wavefield gathers computed as described above form a geophysical data product indicative of certain properties of a subterranean formation. The geophysical data product may include processed seismic data and may be stored on a computer-readable medium as described above. The geophysical data product may be produced offshore (i.e. by equipment on the survey vessel 102) or onshore (i.e. at a computing facility on land) either within the United States or in another country. When the geophysical data product is produced offshore or in another country, it may be imported onshore to a data-storage facility in the United States. Once onshore in the United States, geophysical analysis may be performed on the data product.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A method to generate an image of a subterranean formation using a computer system that includes one or more processors and one or more data-storage devices, the method comprising:

computing forward and backward extrapolated gathers based on a pressure wavefield gather for each trial depth of a series of trial depths, the pressure wavefield gather generated by receivers of a seismic data acquisition system located beneath a free-surface of a body of water;

computing an approximate frozen free-surface profile of the free-surface based on the forward and backward extrapolated gathers;

computing an approximate vertical particle velocity wavefield gather based on the pressure wavefield gather and the approximate frozen free-surface profile;

computing one of separate up-going and down-going vertical particle velocity wavefield gathers based on the pressure wavefield gather and the approximate vertical particle velocity wavefield gather; and generating an image of the subterranean formation using at least in part the up-going vertical particle wavefield gather, the image revealing subsurface structural information about the subterranean formation.

2. The method of claim 1, wherein computing the approximate frozen free-surface profile of the free-surface based on the forward and backward extrapolated gathers further comprises:
for each trail depth, computing a set of maximum energy differences for each time window of a series of time windows applied to the forward and backward extrapolated gathers; and
for each time window, computing a peak energy from the sets of maximum energy differences computed for each trial depth.

3. The method of claim 2, wherein computing the set of maximum energy differences for each time window of the series of time windows further comprises:
computing a difference gather based on the pair of forward and backward extrapolated gathers associated with each trial depth; and
computing the set of maximum energy differences for each time window of a series of time windows applied to the difference gathers.

4. The method of claim 2, wherein computing the set of maximum energy differences for each time window of the series of time windows further comprises:
computing energy differences for each time window applied to the same time interval of the forward and backward extrapolated gathers associated with each trial depth; and
computing a set of maximum energy differences for each time window of a series of time windows applied to the forward and backward extrapolated gathers.

5. The method of claim 2, wherein computing the peak energy of the sets of maximum energy differences further comprises identifying a maximum of the sets of maximum energy differences.

6. The method of claim 1, wherein computing the approximate frozen free-surface profile of the free-surface further comprises interpolating the approximate frozen free-surface profile of the free-surface based on peak energy differences between the forward and backward extrapolated gathers.

7. The method of claim 1, wherein computing the gather of approximate vertical particle velocity wavefield data further comprises:
computing frozen free-surface wavefield reflectivity based on the approximate frozen free-surface profile;
computing a pressure wavefield gradient based on the frozen free-surface wavefield reflectivity and the pressure wavefield data; and
computing the gather of approximate vertical particle velocity wavefield data from the pressure wavefield gradient.

8. The method of claim 1 executed on a programmable computer programmed to execute the method.

9. The method of claim 1 further comprises storing the gather of approximate vertical particle velocity wavefield data in one or more data-storage devices.

10. The method of claim 1, wherein the wavefield gathers form a geophysical data product, further comprising recording the geophysical data product on a physical, non-volatile computer-readable medium suitable for importing onshore.

11. The method of claim 10, further comprising performing geophysical analysis onshore on the geophysical data product.

12. The method of claim 1, computing the approximate frozen free-surface profile further comprises:
computing a frozen-free-surface extension from a free-surface model based on parameters associated with weather conditions measured at the time of the marine survey; and
combining the frozen-free-surface extension with the approximate frozen free surface profile.

13. A computer system to generate an image of a subterranean formation, the system comprising:
one or more processors;
one or more data-storage devices; and
a routine stored in one or more of data-storage devices that when executed by the one or more processors performs
computing forward and backward extrapolated gathers based on a pressure wavefield gather for each trial depth of a series of trial depths;
computing an approximate frozen free-surface profile of the free-surface based on the forward and backward extrapolated gathers;
computing an approximate vertical particle velocity wavefield gather based on the pressure wavefield gather and the approximate frozen free-surface profile;
computing one of separate up-going and down-going pressure and vertical particle velocity wavefield gathers based on the pressure wavefield gather and the approximate vertical particle velocity wavefield gather; and
generating an image of the subterranean formation using at least in part the up-going vertical particle wavefield gather, the image revealing subsurface structural information about the subterranean formation.

14. The computer system of claim 13, wherein computing the approximate frozen free-surface profile of the free-surface based on the forward and backward extrapolated gathers further comprises:
for each trail depth, computing a set of maximum energy differences for each time window of a series of time windows applied to the forward and backward extrapolated gathers; and
for each time window, computing a peak energy from the sets of maximum energy differences computed for each trial depth.

15. The computer system of claim 14, wherein computing the set of maximum energy differences for each time window of the series of time windows further comprises:
computing a difference gather based on the pair of forward and backward extrapolated gathers associated with each trial depth; and
computing the set of maximum energy differences for each time window of a series of time windows applied to the difference gathers.

16. The computer system of claim 14, wherein computing the set of maximum energy differences for each time window of the series of time windows further comprises
computing energy differences for each time window applied to the same time interval of the forward and backward extrapolated gathers associated with each trial depth; and
computing the set of maximum energy differences for each time window of a series of time windows applied to the forward and backward extrapolated gathers.

17. The computer system of claim 14, wherein computing the peak energy of the sets of maximum energy differences further comprises identifying the maximum of the sets of maximum energy differences.

18. The computer system of claim 13, wherein computing the approximate frozen free-surface profile of the free-surface further comprises interpolating the approximate frozen free-surface profile of the free-surface based on peak energy differences between the forward and backward extrapolated gathers.

19. The computer system of claim 13, wherein computing the gather of approximate vertical particle velocity wavefield data further comprises:
  computing frozen free-surface wavefield reflectivity based on the approximate frozen free-surface profile;
  computing a pressure wavefield gradient based on the frozen free-surface wavefield reflectivity and the pressure wavefield data; and
  computing the gather of approximate vertical particle velocity wavefield data from the pressure wavefield gradient.

20. The computer system of claim 13 further comprises storing the gather of approximate vertical particle velocity wavefield data in the one or more data-storage devices.

21. The computer system of claim 13, wherein the wavefield gathers form a geophysical data product, further comprising recording the geophysical data product on a physical, non-volatile computer-readable medium suitable for importing onshore.

22. The computer system of claim 21, further comprising performing geophysical analysis onshore on the geophysical data product.

23. The medium of claim 22, wherein the wavefield gathers form a geophysical data product, further comprising recording the geophysical data product on a physical, non-volatile computer-readable medium suitable for importing onshore.

24. The medium of claim 23, further comprising performing geophysical analysis onshore on the geophysical data product.

25. A non-transitory computer-readable medium having machine-readable instructions encoded thereon for enabling one or more processors of a computer system to perform the operations of
  computing forward and backward extrapolated gathers based on a pressure wavefield gather for each trial depth of a series of trial depths;
  computing an approximate frozen free-surface profile of the free-surface based on the forward and backward extrapolated gathers;
  computing an approximate vertical particle velocity wavefield gather based on the pressure wavefield gather and the approximate frozen free-surface profile;
  computing one of separate up-going and down-going pressure and vertical particle velocity wavefield gathers based on the pressure wavefield gather and the approximate vertical particle velocity wavefield gather; and
  generating an image of the subterranean formation using at least in part the up-going vertical particle wavefield gather, the image revealing subsurface structural information about the subterranean formation.

26. The medium of claim 25, wherein computing the approximate frozen free-surface profile of the free-surface based on the forward and backward extrapolated gathers further comprises:
  for each trail depth, computing a set of maximum energy differences for each time window of a series of time windows applied to the forward and backward extrapolated gathers; and
  for each time window, computing a peak energy from the sets of maximum energy differences computed for each trial depth.

27. The medium of claim 26, wherein computing the set of maximum energy differences for each time window of the series of time windows further comprises:
  computing a difference gather based on the pair of forward and backward extrapolated gathers associated with each trial depth; and
  computing the set of maximum energy differences for each time window of a series of time windows applied to the difference gathers.

28. The medium of claim 26, wherein computing the set of maximum energy differences for each time window of the series of time windows further comprises:
  computing energy differences for each time window applied to the same time interval of the forward and backward extrapolated gathers associated with each trial depth; and
  computing the set of maximum energy differences for each time window of a series of time windows applied to the forward and backward extrapolated gathers.

29. The medium of claim 26, wherein computing the peak energy of the sets of maximum energy differences further comprises identifying the maximum of the sets of maximum energy differences.

30. The medium of claim 25, wherein computing the approximate frozen free-surface profile of the free-surface further comprises interpolating the approximate frozen free-surface profile of the free-surface based on peak energy differences between the forward and backward extrapolated gathers.

31. The medium of claim 25, wherein computing the gather of approximate vertical particle velocity wavefield data further comprises:
  computing frozen free-surface wavefield reflectivity based on the approximate frozen free-surface profile;
  computing a pressure wavefield gradient based on the frozen free-surface wavefield reflectivity and the pressure wavefield data; and
  computing the gather of approximate vertical particle velocity wavefield data from the pressure wavefield gradient.

32. The medium of claim 25 executed on a programmable computer programmed to execute the method.

33. The medium of claim 25 further comprises storing the gather of approximate vertical particle velocity wavefield data in one or more data-storage devices.

* * * * *